United States Patent [19]
Amar et al.

[11] 3,902,052
[45] Aug. 26, 1975

[54] METHOD AND APPARATUS FOR THE PEAK MONITORING THE RESULTS OF ANALYSIS APPARATUS

[75] Inventors: Henry E. Amar, Bronville; John J. Grady, Irvington, both of N.Y.

[73] Assignee: Technicon Instruments Corporation, Tarrytown, N.Y.

[22] Filed: June 11, 1973

[21] Appl. No.: 368,490

[52] U.S. Cl. .................. 235/151.35; 235/151.13
[51] Int. Cl.² ............................................ G06F 15/20
[58] Field of Search ......... 235/150.1, 151.3, 151.35, 235/151.13, 92 PC; 444/1; 128/2.06 A, 26; 356/39 R

[56] References Cited
UNITED STATES PATENTS

| | | | |
|---|---|---|---|
| 3,526,836 | 9/1970 | Deger et al. | 235/151.3 UX |
| 3,552,386 | 1/1971 | Horth | 128/2.06 A |
| 3,700,867 | 10/1972 | Hogg | 235/92 PC X |
| 3,703,726 | 11/1972 | Stephenson | 235/151.35 X |
| 3,759,248 | 9/1973 | Valiquette | 128/2.06 A |
| 3,771,167 | 11/1973 | Ross | 235/150.1 X |

Primary Examiner—Joseph F. Ruggiero
Attorney, Agent, or Firm—S. P. Tedesco; Stephen E. Rockwell

[57] ABSTRACT

Method and apparatus are provided for determining the validity and maximizing the accuracy of analytical results provided by automated sample analysis apparatus which operate in accordance with ideal operational characteristics and wherein the analytical results are provided in the form of a series of data outputs for each sample analysis and comprise the constant monitoring of the data outputs produced by the apparatus upon the analysis of a sample, the comparison of the thusly monitored data outputs to determine the variations therebetween, the comparison of variations with said ideal operational characteristics of said apparatus so as to verify the validity of the thusly monitored data outputs, and the selection and outputting as the sample analysis results in accordance with said comparisons of those of said data outputs which are most analytically correct to thus maximize the accuracy of said results.

38 Claims, 21 Drawing Figures

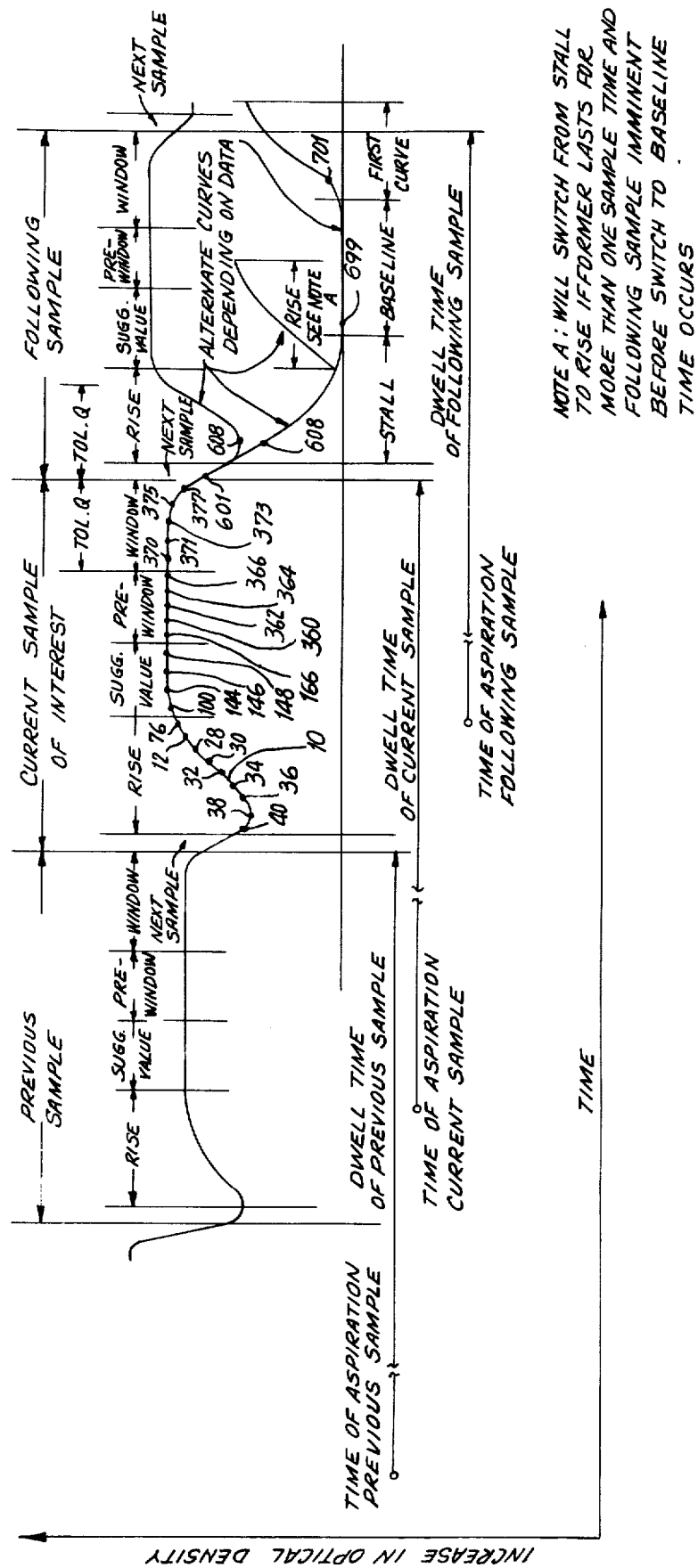

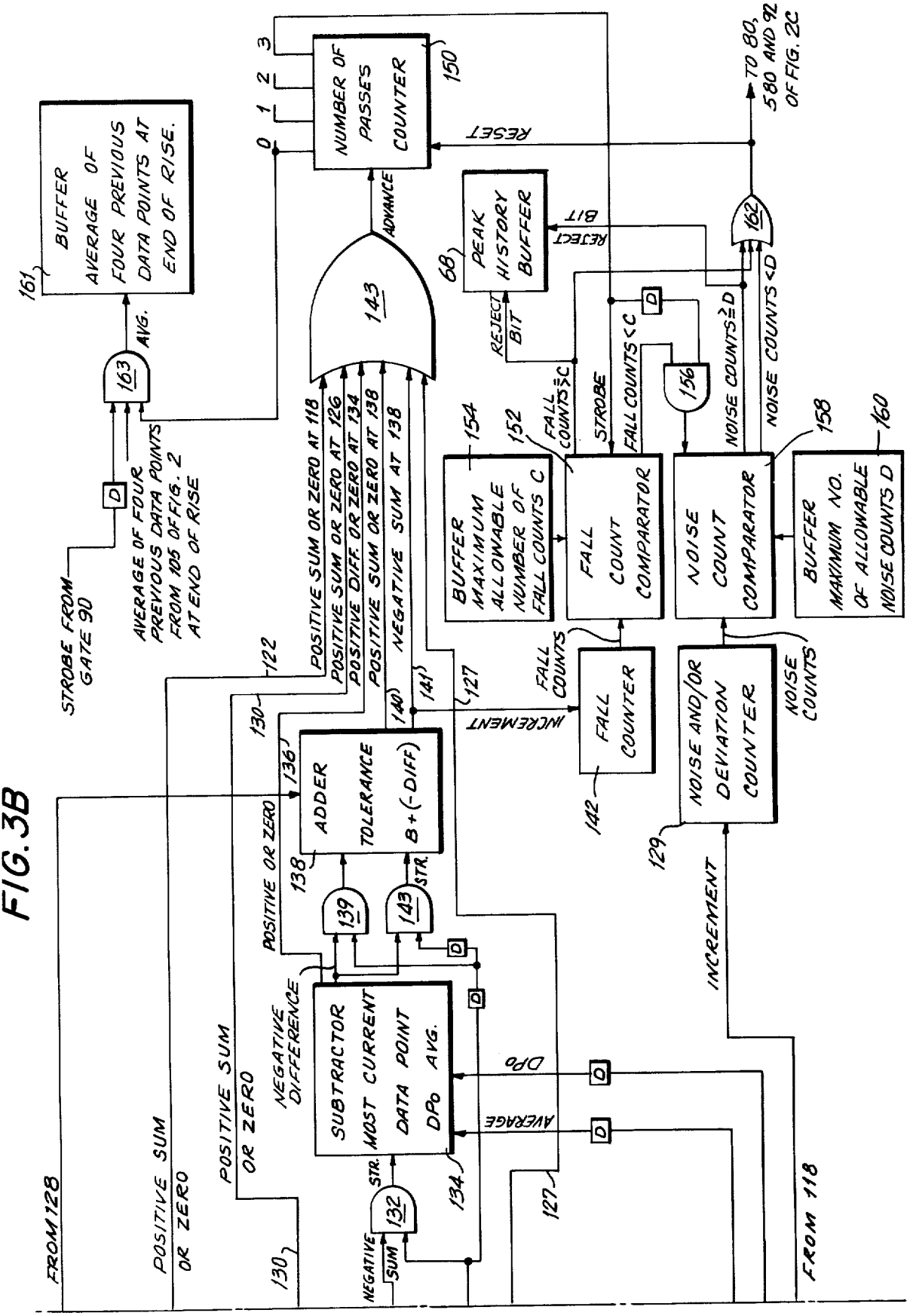

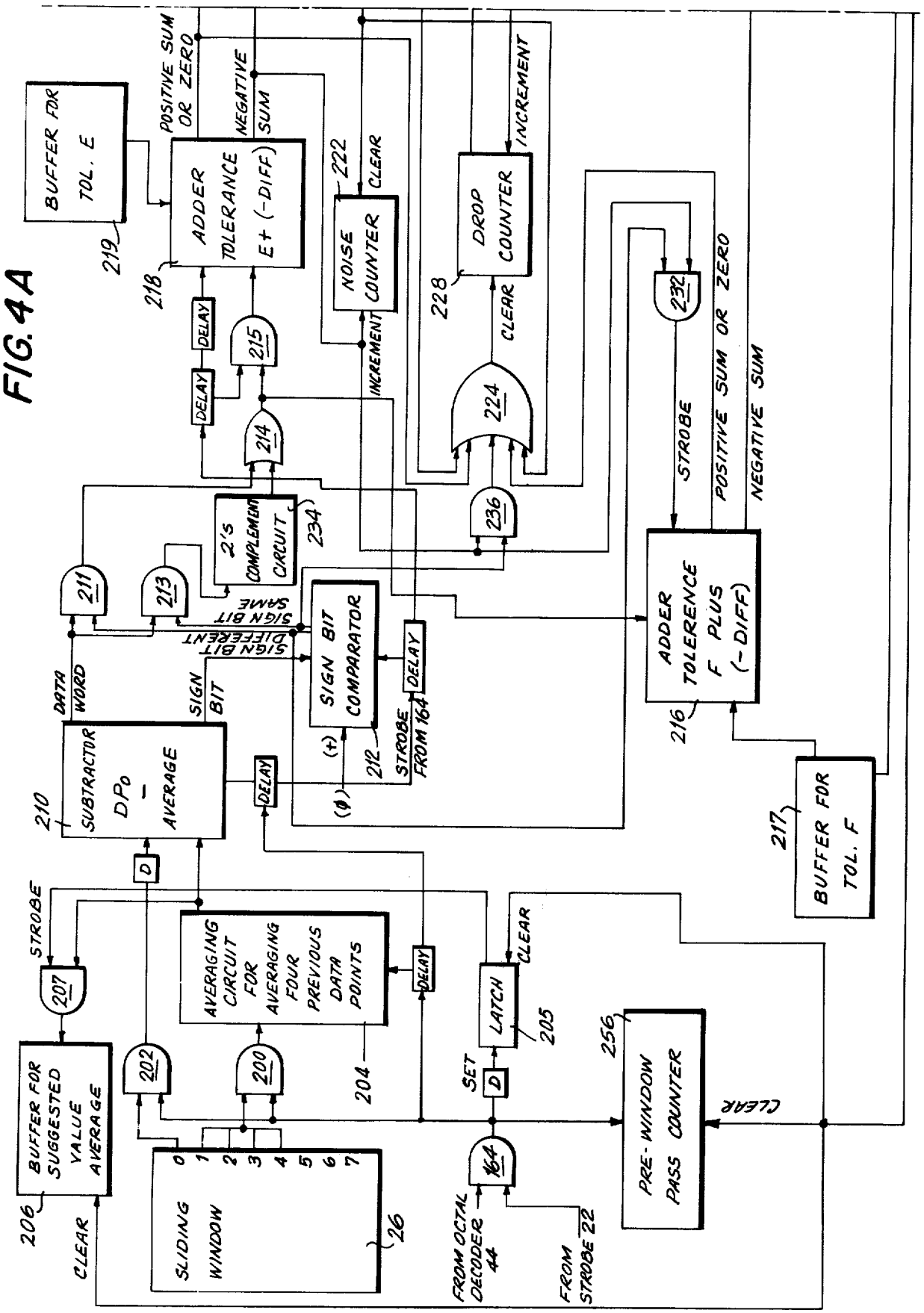

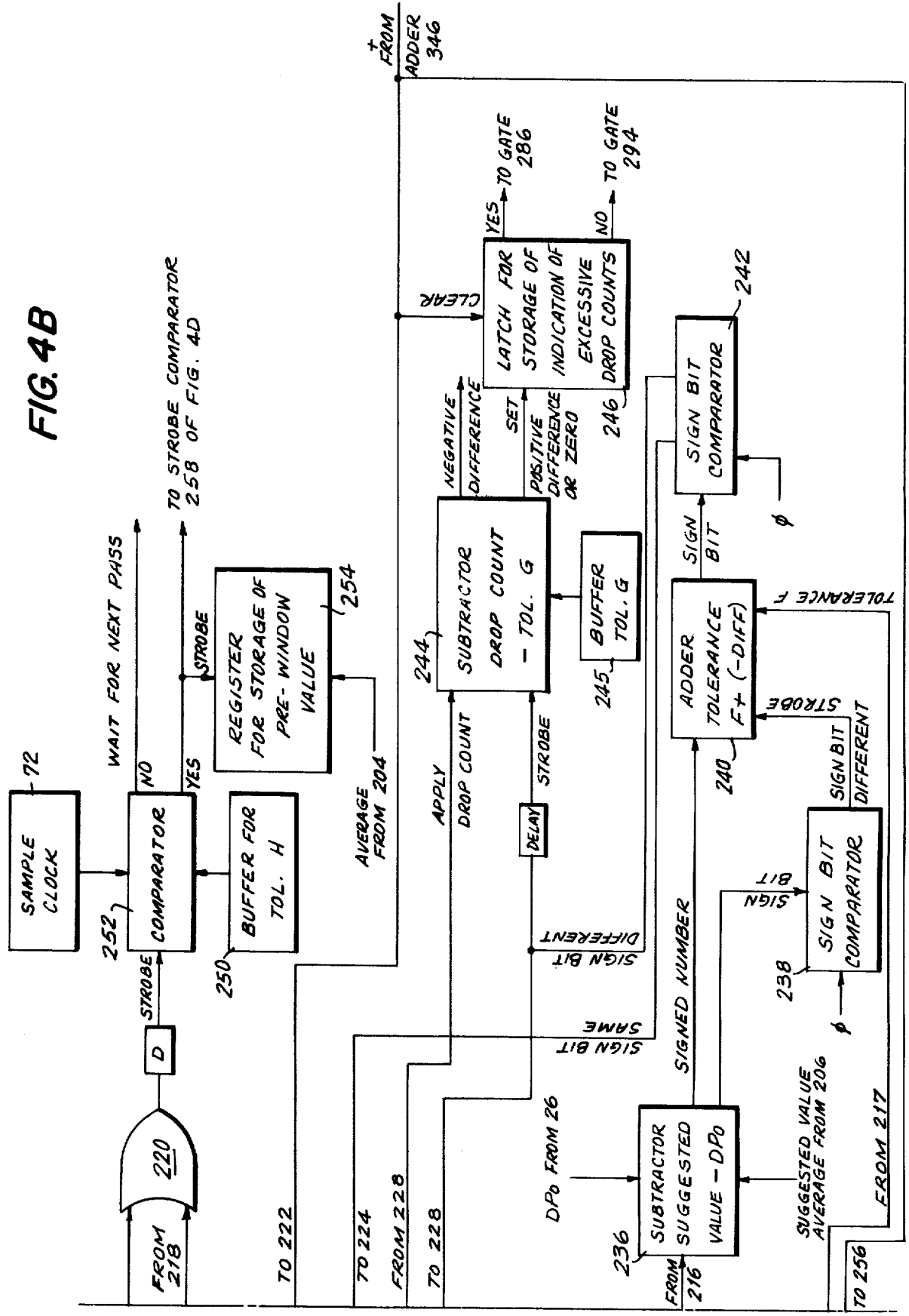

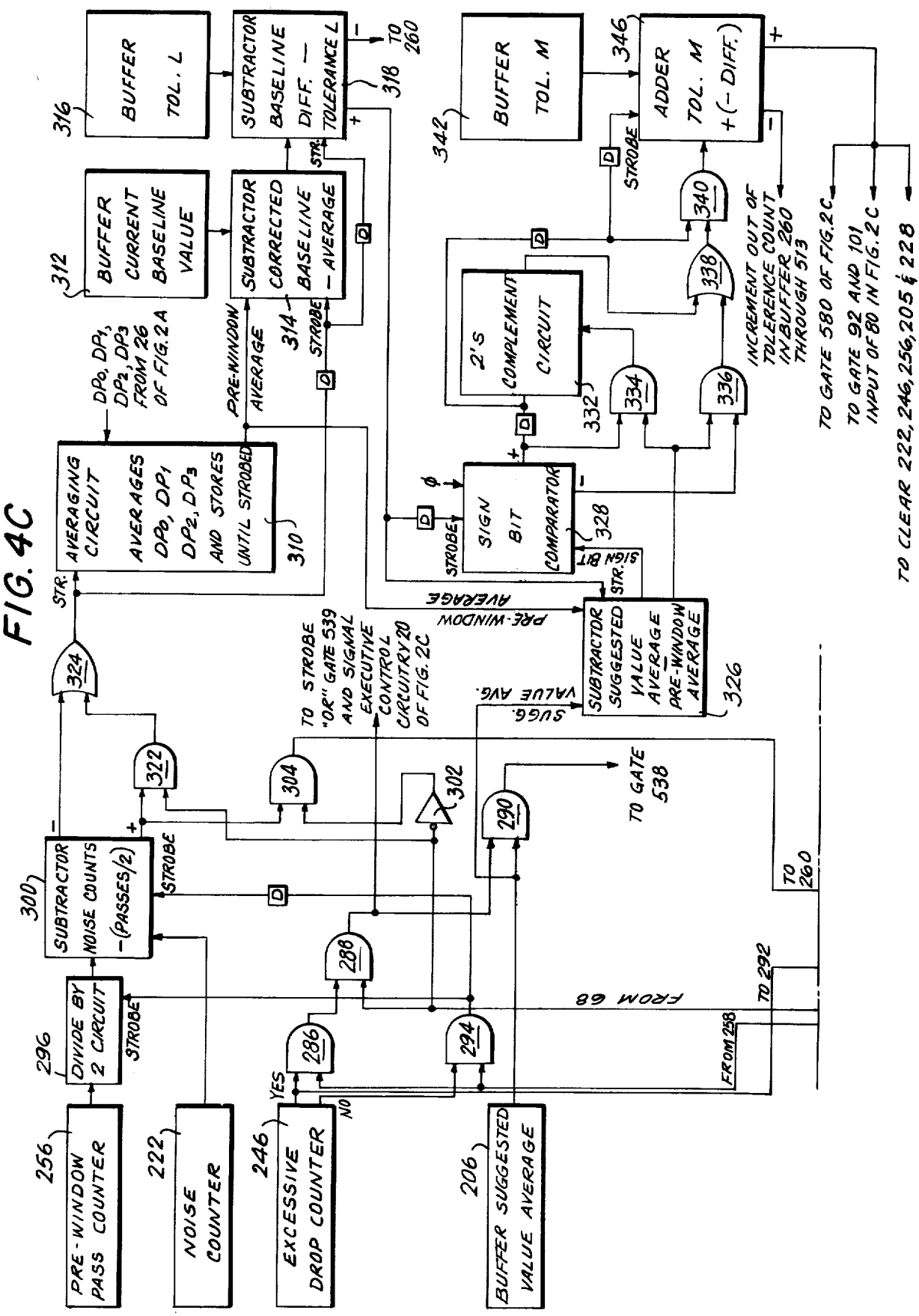

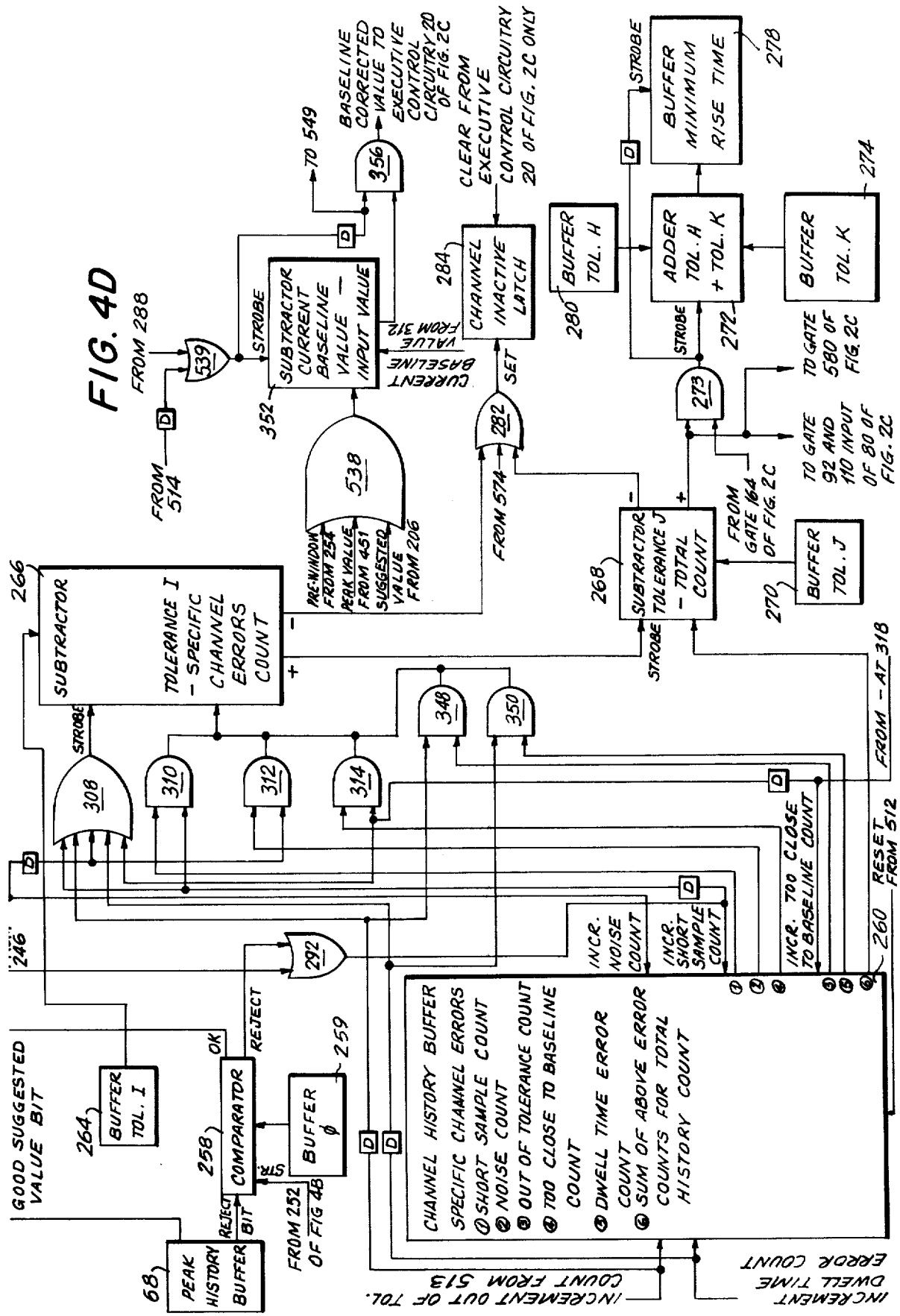

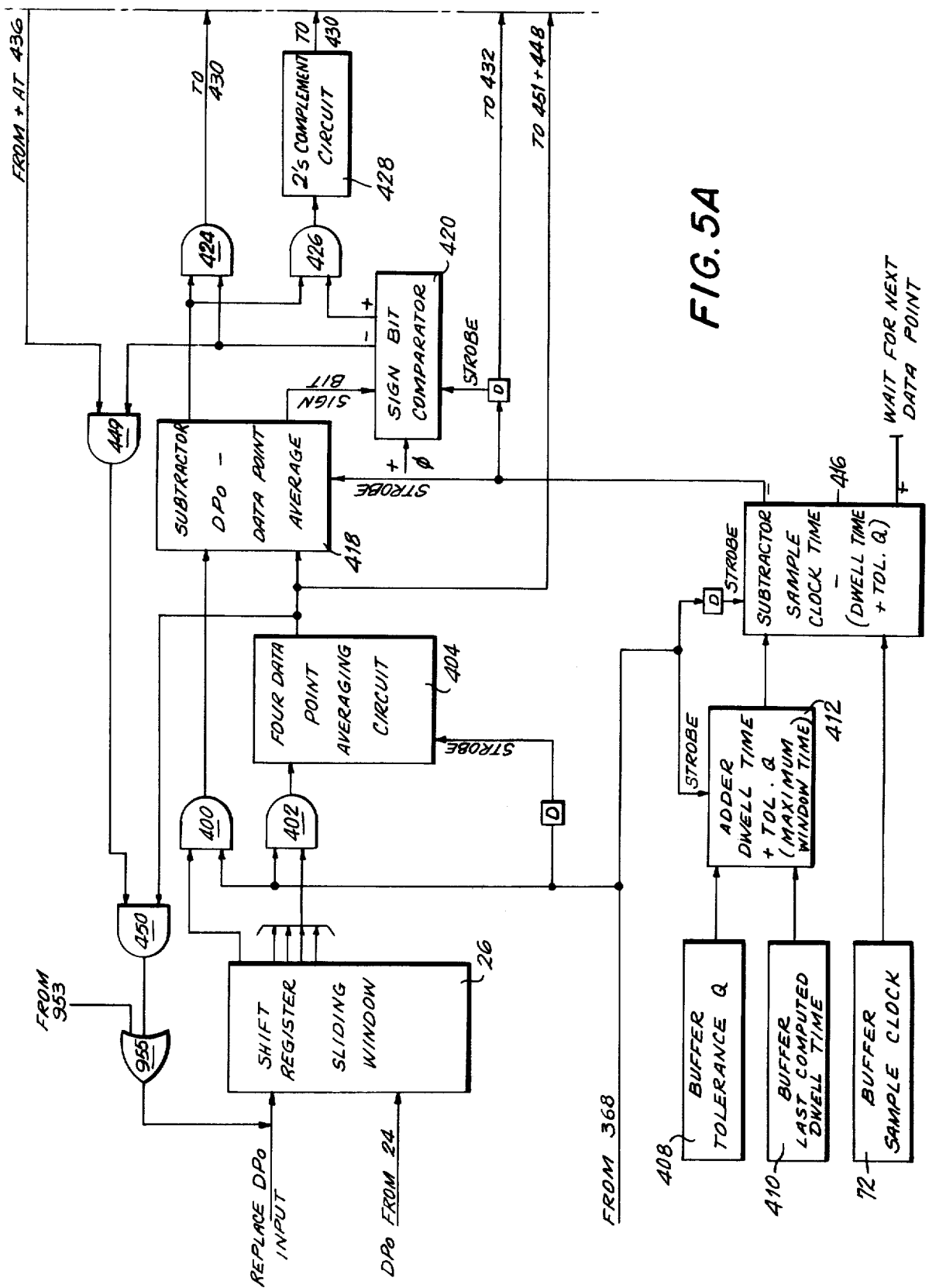

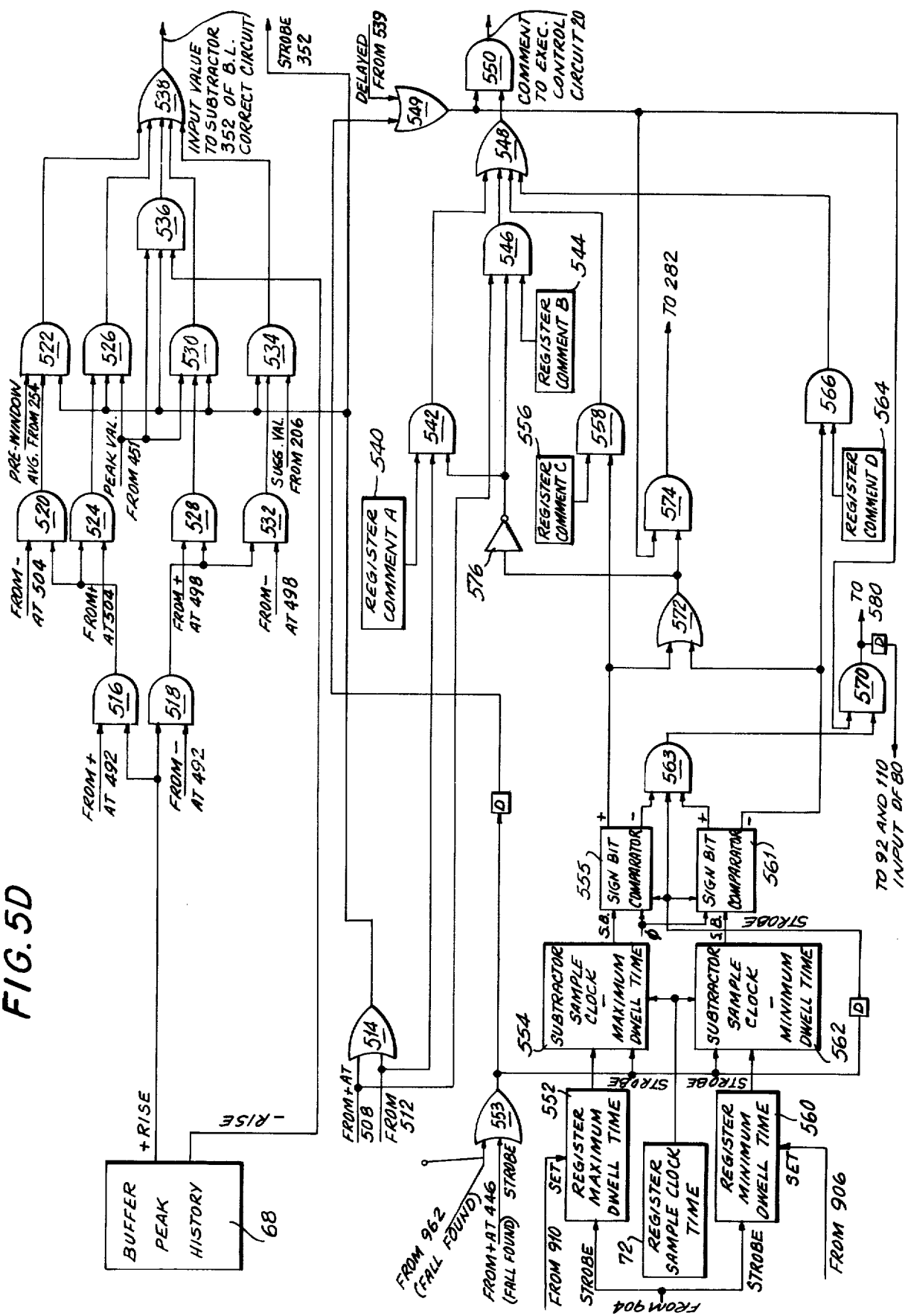

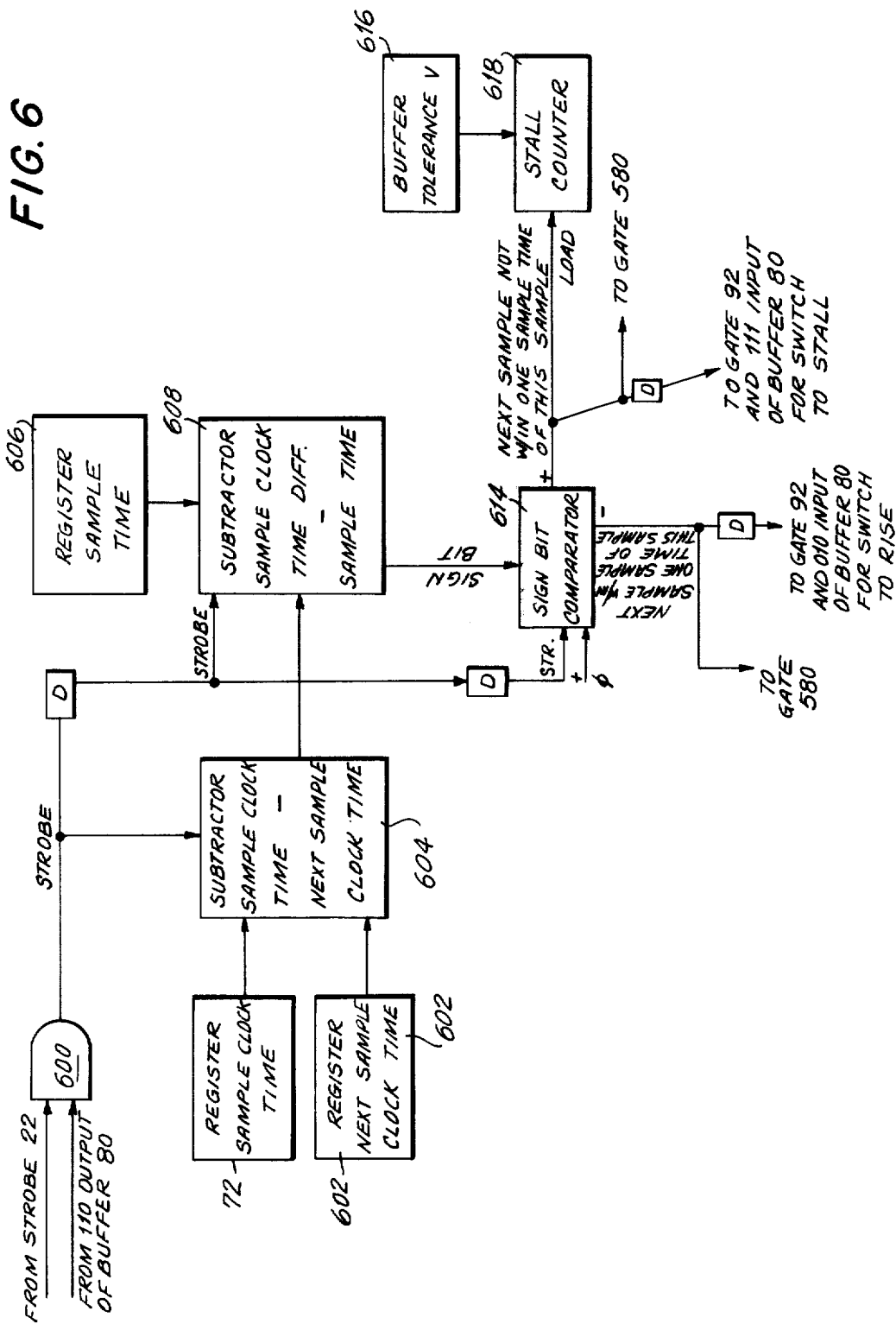

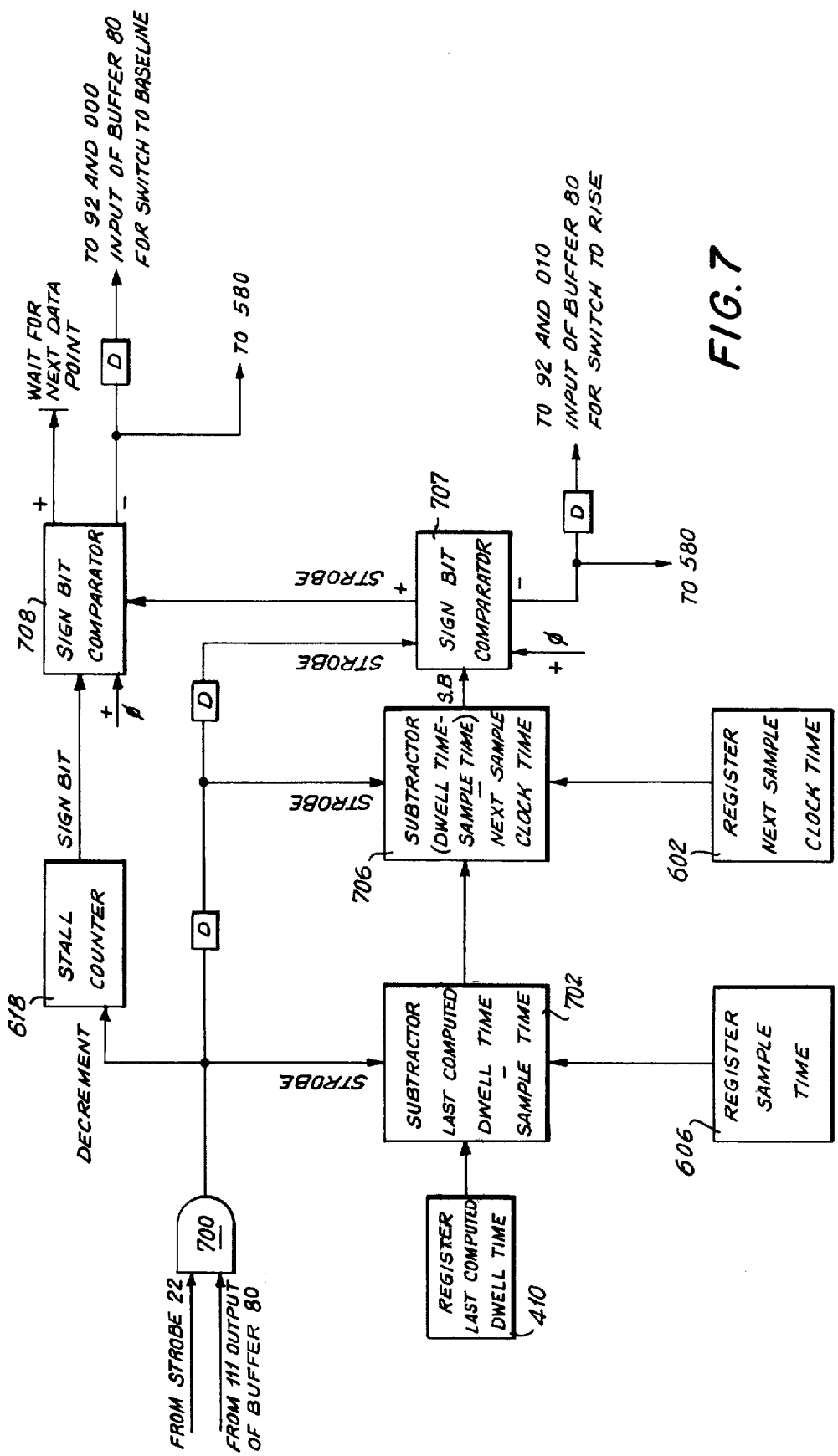

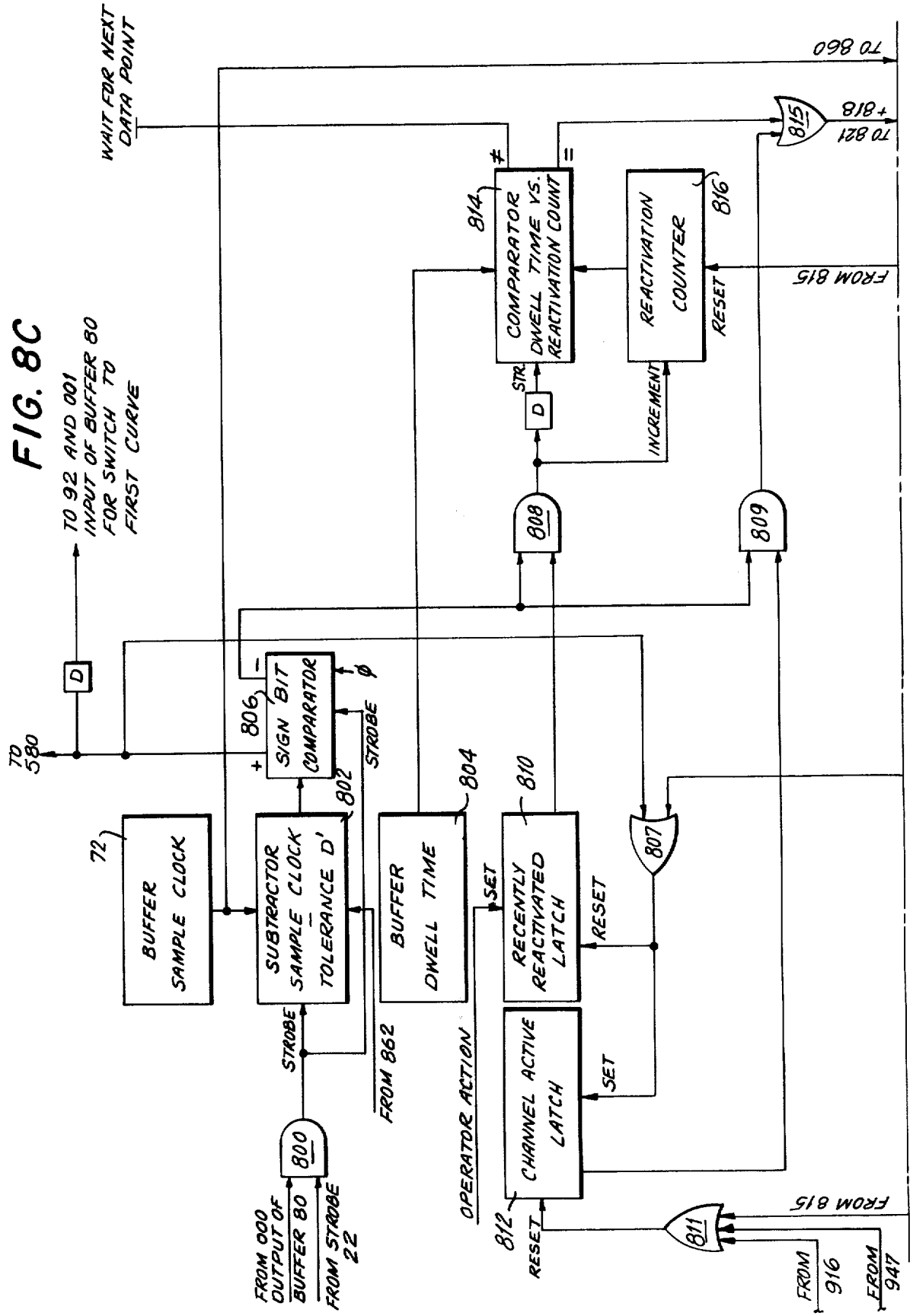

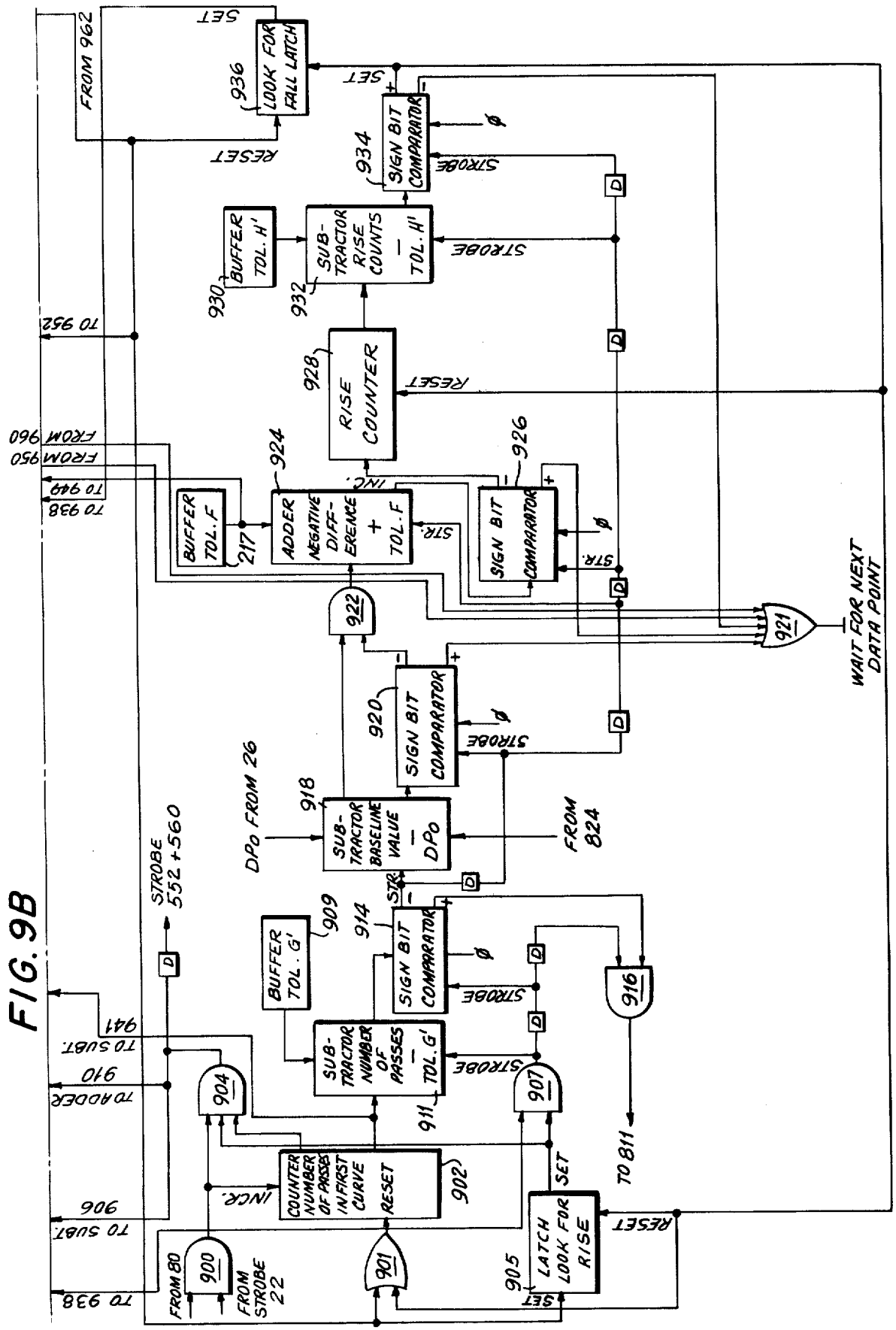

3,902,052

METHOD AND APPARATUS FOR THE PEAK MONITORING THE RESULTS OF ANALYSIS APPARATUS

BACKGROUND OF THE INVENTION

1. Field of the Invention

This invention relates to new and improved method and apparatus for the constant monitoring of the results of analysis apparatus in order to constantly verify the validity thereof and to maximize the accuracy thereof.

2. Description of the Prior Art

Although monitoring methods and apparatus are known for monitoring the results of analysis apparatus, it may be understood that the same will, in general, be found to simply present the analysis results at the conclusion of the analysis function leaving the interpretation of the validity thereof, and of any anomalies or inconsistencies therein, strictly to operator interpretation and will now, except in instances of the most severe malfunction, be found to provide any indicia of malfunction or take any substantial corrective action, none are known which are operable to constantly monitor the data outputs which constitutes said results in real time in order to provide immediate indication of analysis results invalidity and concomitant indicia of the nature of said invalidity. In addition, no prior art monitoring method and apparatus are known which will constantly monitor said data outputs in real time and automatically select that portion thereof which is most analytically correct, in accordance with the characteristics of said output data as a whole, and output said selected data outputs as the analysis results to thus maximize the accuracy of the latter. Too, no prior art monitoring method and apparatus are known which, in conjunction with those features just described, will automatically identify imperfect but not invalid data outputs as such or which will, in instances wherein a series of samples are analyzed in succession, either automatically reject as invalid the provided output data in instances wherein the variation between the respective sample analysis times exceed predetermined limits, or automatically update the sample analysis time from which said predetermined limit is to be measured in the event that said variation does not exceed said limit.

OBJECTS OF THE INVENTION

It is, accordingly, an object of this invention to provide new and improved peak monitoring method and apparatus for the constant monitoring in real time of the analysis results provided by the operation of the analysis apparatus.

Another object of this invention is the provision of method and apparatus as above which are operable, in accordance with ideal operational characteristics of the analysis apparatus, to constantly verify the validity of the provided data outputs which constitute the analysis results and, in the event of a determination of data output invalidity, to provide immediate indication thereof and discontinue operation of the analysis apparatus.

Another object of the invention is the provision of method and apparatus as above which function to select from the total of data outputs which constitute the analysis results those data outputs which are most analytically correct and to output only said selected data outputs as the analysis results to thereby maximize the accuracy of the latter.

Another object of the invention is the provision of method and apparatus as above which are operable, in the event of imperfect but not invalid data outputs, to identify accordingly said selected data outputs which are outputted as the analysis results.

A further object of the invention is the provision of method and apparatus as above which are operable to constantly monitor the respective analysis time in instances of repeated analyses and to either discontinue analysis apparatus operation if said analysis times vary beyond a predetermined limit or to update said analysis times if said variation is within said limit.

A further object of the invention is the provision of apparatus as above which is of substantially solid state construction having no moving parts and which should thus provide long periods of satisfactory, substantially maintenance-free operation.

SUMMARY OF THE DISCLOSURE

As disclosed herein, the new and improved method and apparatus of the invention are applied to the constant monitoring in real time of the data outputs constituting the analysis results from blood sample analysis apparatus which operate in accordance with ideal operational characteristics to successively analyze a series of blood samples. As each of the data outputs is received, it is stored and compared with previously monitored data outputs to determine the variation therebetween. Tolerances regarding the magnitude and number of said data output variations are derived from the ideal operational characteristics of the analysis apparatus and are stored in the monitoring apparatus. The data output variations are compared to applicable ones of said tolerances, in manner and sequence also determined by said ideal operational characteristics of the sample analysis apparatus, to verify the validity of the involved data outputs, and the results of such comparisons are stored. In instances wherein a data output variation exceeds an applicable tolerance, the data output may be rejected and operation of the analysis apparatus discontinued. Alternatively, indication of such condition is simply provided and stored. At the completion of sample analysis, and in the event that the data outputs for the sample in question have not been rejected, a review is made of the stored data output variation-tolerance comparisons and those data outputs which are most analytically correct are selected and outputted as the results of the sample analysis to thus maximize the accuracy of the analysis results. Constant monitoring and storage of the analysis time for each of the samples is also effected, and variations therein compared to applicable tolerances to result in either rejection of the output data or updating of the stored sample analysis times.

DESCRIPTION OF THE DRAWINGS

The above and other objects and significant advantages of the invention are believed made clear by the following detailed description thereof taken in conjunction with the accompanying drawings wherein;

FIG. 1 is a curve representing a plot of the output data provided by automated analysis apparatus for the analysis of three successive samples;

FIGS. 3A and 3B are respectively schematic diagrams illustrating the monitoring of the suggested value portion of the curve of FIG. 1;

FIGS. 4A, 4B, 4C and 4D are respectively schematic diagrams illustrating the monitoring of the pre-window portion of the curve of FIG. 1;

FIGS. 5A, 5B, 5C and 5D are respectively schematic diagrams illustrating the monitoring of the window portion of the curve of FIG. 1;

FIG. 6 is a schematic diagram illustrating the monitoring of the next sample portion of the curve of FIG. 1;

FIG. 7 is a schematic diagram illustrating the monitoring of the stall portion of the curve of FIG. 1;

FIG. 8A, 8B and 8C are respectively schematic diagrams illustrating the monitoring of the baseline portion of the curve of FIG. 1; and FIGS. 9A and 9B are respectively schematic diagrams illustrating the monitoring of the first curve portion of FIG. 1.

DESCRIPTION OF THE INVENTION

Figure 2A:
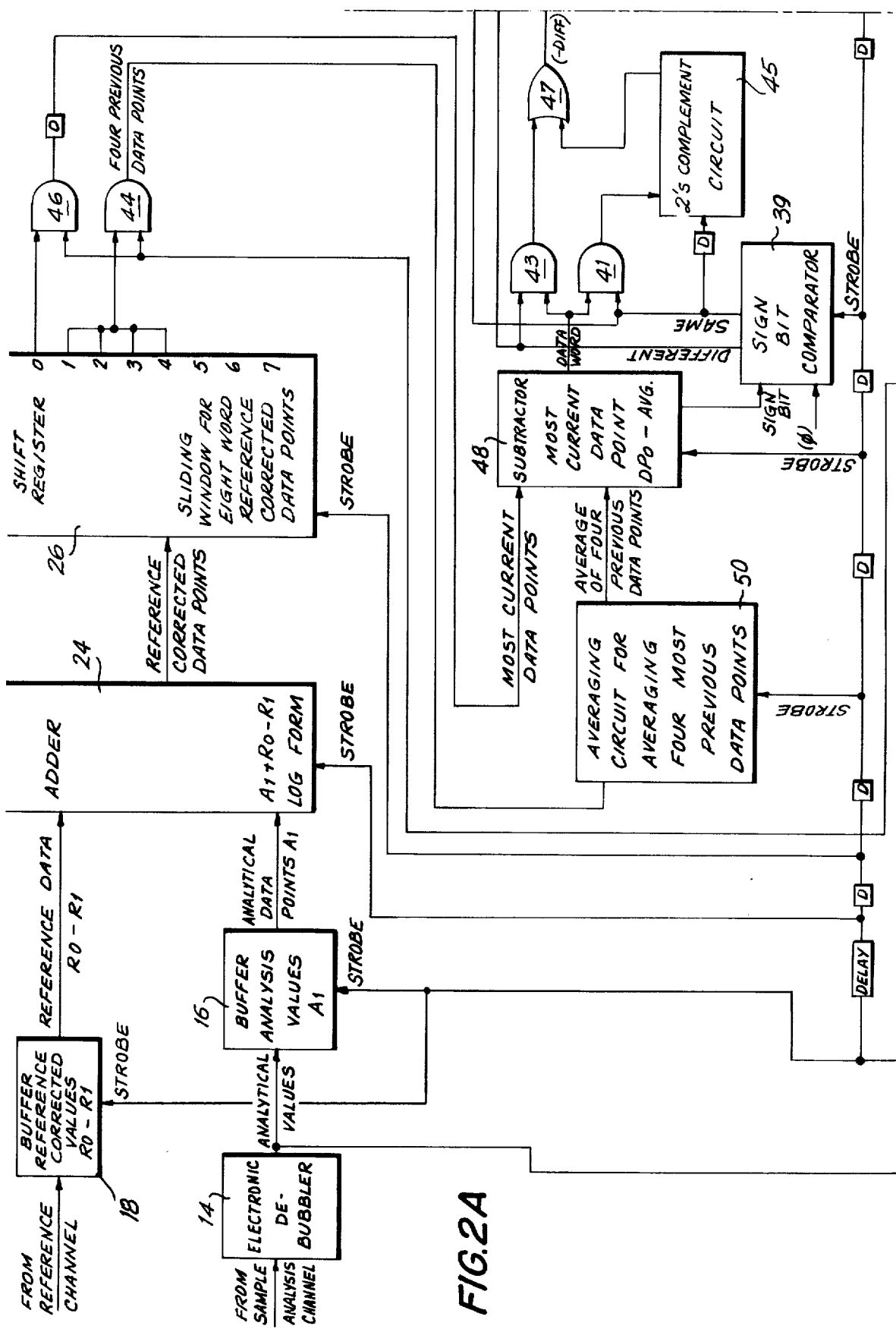
FIGS. 2A, 2B and 2C are respectively schematic diagrams illustrating the monitoring of the rise portion of the curve of FIG. 1.

Referring now to FIG. 1, the curve 10 represents the results of the automated, successive treatment and analysis of a stream of a series of samples and is formed as illustrated by an interconnected series of data points. Such treatment and analysis may, for example, be accomplished by automated blood sample analysis apparatus, and comprise the successive mixing of a series of blood samples with an appropriate reagent, the successive treatment of the resultant mixtures, and the successive colorimetric, ion electrode detector, fluormetric and/or nephilometric analyses of the thusly treated mixtures for quantitative determination of a blood sample constituent of interest in accordance, for example with regard to colorimetric analysis, with the change of the optical densities of the mixtures in accordance with Beer's Law, all in the general manner described in basic detail in U.S. Pat. Nos. 3,241,432 and 3,134,263. For such analysis, it may be understood that the curve 10 is representative of an ideal curve for a particular blood sample analysis chemistry as will be provided by the blood sample analysis apparatus in accordance with ideal operational characteristics thereof.

In automated blood sample analysis of this nature, each data output or data point will, of course, be provided by the output of the photomultiplier tube of the colorimeter which is in turn dependent upon the optical density of the appropriately treated sample-reagent mixture then in the sight path of the colorimeter flow cell. For such automated analysis, a segment or segments of a generally clear wash liquid and attendant intersample air bubble is provided between the respective samples of said stream, and this fact is clearly indicated in curve 10 by the dips which occur just preceding the flow of each treated sample through the colorimeter. The dwell time or time taken for the flow of each sample from the aspiration thereof to the flow thereof and its associated wash liquid through the colorimeter flow cell is indicated as DT, and a tolerance Q is provided as shown for each such dwell time to allow for limited variation therein. As depicted, the curve 10 is divided into basic sections which include rise, suggested value, pre-window, window, next sample, stall, baseline and first curve, respectively, and it may be understood that the operation of the peak monitor of the invention will be described in relation to the functions performed thereby on the analytical data which constitute each of said curve sections.

The overall function of the peak monitor of the invention is to constantly monitor the analytical data for each section of the curve 10 to verify the validity of said data, and to select the best, or most analytically correct and representative, data point or curve value for each sample in the stream under analysis. This selection is accomplished through use of the criterion that, in continuous flow analysis, the general rule is that the best or most analytically correct data point or curve value is that value from the generally steady state conditions portion of the curve which immediately precedes the fall of the curve for that sample since such data point or curve value should be indicative of the optical density of the most homogeneous portion of the reactivated sample as results from sample-reagent mixture and treatment. There are, however, exceptions to this general rule as described in detail hereinbelow.

As each of the data outputs or data points which form the curve 10 is provided by the sample analysis apparatus to the peak monitor, the same is automatically classified and stored in accordance with said ideal operational characteristics of said sample analysis apparatus by determining which curve section said data points will become a part of; and this classification may thus be understood to determine which of the functions of the peak monitor will be performed on said data point. These functions of the peak monitor may, in general, each be understood to include the comparison of the most currently received data point with an average of previously provided and stored data points to determine the variation therebetween. These variations are then compared by the peak monitor with a number of data point variation tolerances peculiar to the monitoring of the curve section of interest and as are determined for each of said sections in accordance with said ideal operational characteristics of the analysis apparatus by taking into account, for example, the particular blood analysis chemistry under utilization, the current hydraulic conditions of the analysis apparatus, and the previous sample analysis history of said apparatus. Thus may be understood that the data point classification with regard to curve section and attendant peak monitor function is determinative of which of said tolerances are to be applied to data point variations involving said data point. In the event that the data point variation of interest exceeds the applicable tolerance or tolerances to thus raise questions as to the validity of the data point in question and possibly be indicative of apparatus malfunction, this fact may be readily detected and utilized by the peak monitor for rejection of the analytical data on the basis of invalidity, and attendant alerting of the operator of the apparatus.

Figure 2B:
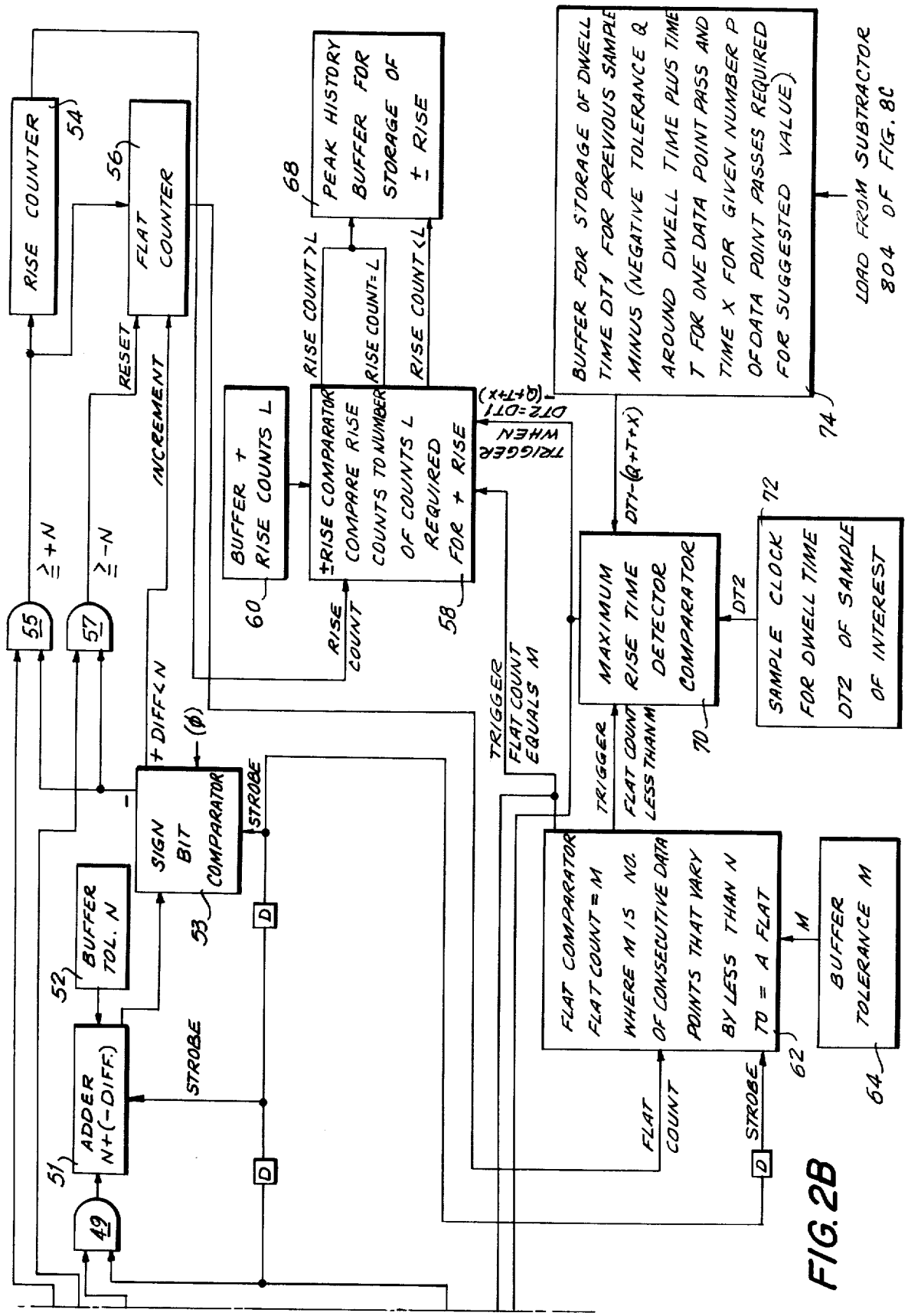
Figure 2C:
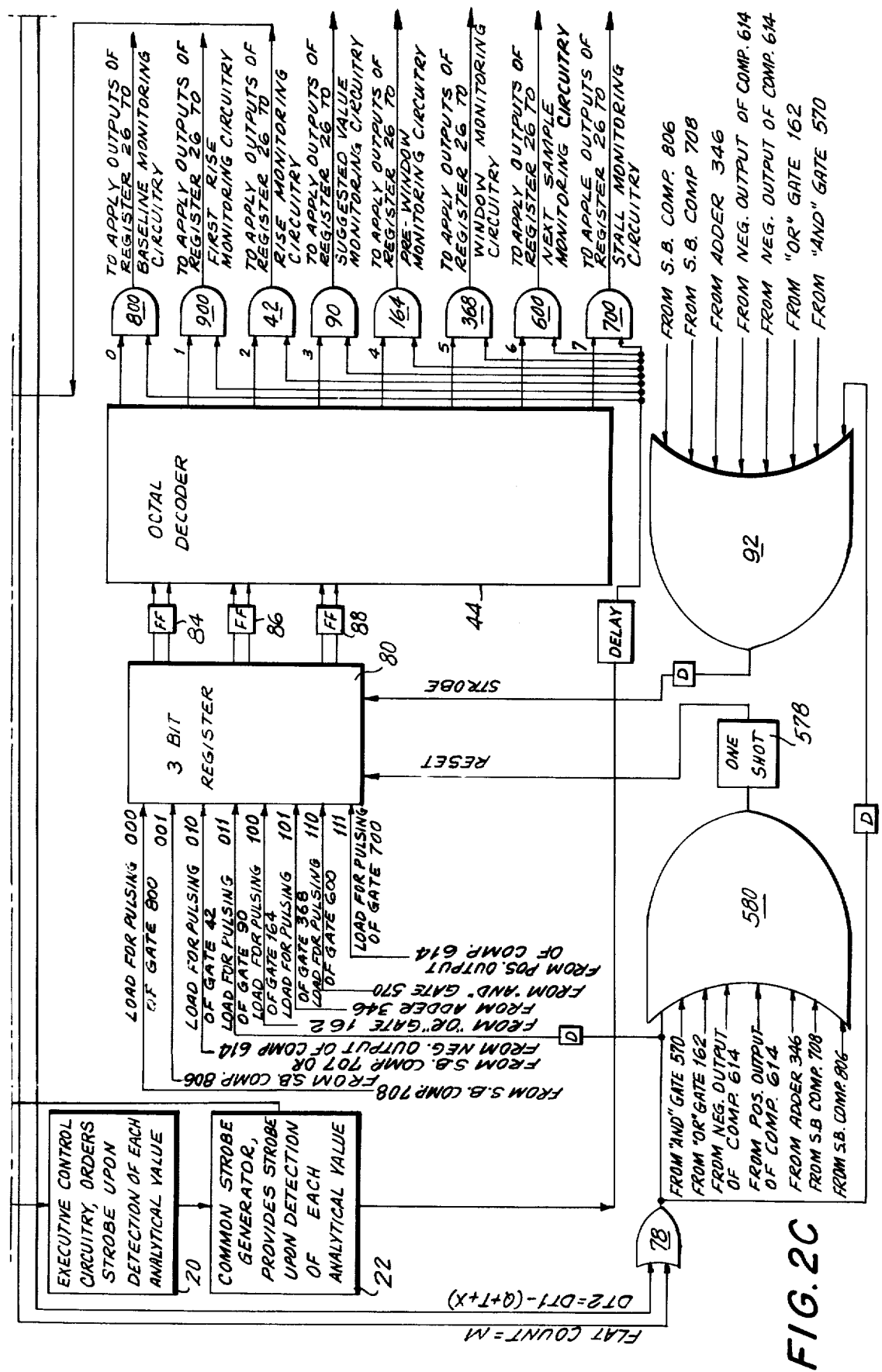

Referring now to FIGS. 2A, 2B and 2C, respectively, and commencing the description of the operation of the peak monitor at the application thereto of the analytical data which is to provide data point 12 (FIG. 1) on curve 10 from electronic de-bubbler 14 (which may take the form of that disclosed in the co-pending application of Stephen P. Barton, et al. entitled "New and Improved System and Method for Improved Operation of a Colorimeter Or Like Optical Analysis Apparatus," Ser. No. 260,552, filed June 7, 1972 and assigned to the assignee hereof, and which is operable to enable the advantageous passage of separating fluid segments through the colorimeter sample flow cell while insuring that the provided output data is representative of the optical density of a sample-reagent mixture segment, only) it may be understood that such data is initially applied as indicated to buffer 16. Concomitantly, the reference data from the colorimeter reference flow cell is applied as indicated to buffer 18. The application of sample data to buffer 16 is detected as indicated by executive control circuitry 20 of the analysis apparatus which is operable in response thereto to effect the provision of a common strobe pulse from strobe generator 22. This strobe pulse is initially applied as indicated to buffers 16 and 18 with resultant application of the respective sample and reference data therefrom as indicated by adder 24 for combination therein in log form as indicated upon the depicted delayed strobbing thereof from strobe generator 20, and subsequent application of the thusly reference corrected data which forms data point 12 (FIG. 1) to shift register or sliding window 26. Shift register 26 is of right word capacity whereby may be understood that, as each data point or word is applied thereto to update the same, the least recently applied data point or word will be discarded therefrom. Thus, the application of data point 12 to shift register 26 will result in data points 12, 28, 30, 32, 34, 36, 38 and 40 (FIG. 1) being retained therein at this time.

The further delayed application as indicated of the strobe pulse from strobe generator 22 to shift register 26, and the correspondingly delayed application of said strobe pulse to "and" gate 42 and concomitant application as indicated of the other pulse to said "and" gate from octal decoder 44 in response to the loading of the 3 bit register 80 at the 010 input thereof as described in detail hereinbelow, will respectively result in the application as indicated of pulses from "and" gate 42 to data path "and" gates 46 and 44, the delayed application as indicated of the most current data point or data point 12 from shift register 26 through "and" gate 46 to the subtractor section of subtractor and comparator 48, and the application as indicated of the four previous data points or data points 28, 30, 32 and 34 from shift register 26 through "and" gate 44 to averaging circuit 50. Although depicted as single gates in order not to overcomplicate the illustration and description of the invention, it may be understood that each of "and" gates 44 and 46, and a number of the "and" and "or" gates as described hereinbelow, provide data paths each comprising a plurality of gates, and that the identifying numbers 44 and 46, and others as are utilized hereinbelow, are multiple gate notations which respectively designate a plurality of gates equal in number to the number of bits which make up each reference-corrected analytical value or data point word to be transmitted thereby.

Averaging circuit 50 is operable upon the indicated further delayed strobbing thereof from common strobe 22 to average said four previous data points and apply the resultant average as indicated to the subtractor section of subtractor and comparator 48.

Subtractor 48 and averaging circuit 50 are the first components described to this point which is utilized exclusively in the rise monitoring function of the peak monitor of the invention, it being understood that buffers 16 and 18, adder 24, sliding window shift register 26, executive control circuitry 20 and strobe generator 22 are amongst other components to be described in detail hereinbelow, common to many functions of the peak monitor. The overall object of the rise monitoring function is to determine whether or not a rise does in fact occur during the rise section of curve 10 and, if so, to determine whether such rise was positive or negative and to store such determination for subsequent curve monitoring utilization. In addition, the rise monitoring function is operable to detect the flattening out of the curve 10 prior to the expiration of the maximum time allotted for rise monitoring and, upon such detection, to immediately switch the peak monitor to the suggested value curve monitoring function upon receipt of the next reference corrected data point by shift register 26, it being understood that such flattening out of the curve 10 is indicative of the fact that the sample-reagent mixture has reached substantial uniformity of concentration and that the region of the most analytically correct optical density of said mixture has been achieved. The rise monitoring function is terminated as described in detail hereinbelow either upon the flattening out of the curve 10 or upon the expiration of the time allotted for said function, whichever comes first.

Returning now to the detailed description of the rise monitoring function, the most current data point 12, or DPo, and the average of the four previous data points 28, 30, 32 and 34 are respectively concomitantly applied as indicated from register 26 and averaging circuit 50 to subtractor 48 for subtraction of said average from DPo upon delayed strobing of said subtractor. The sign bit of the resultant difference is applied to sign bit comparator 39 concomitantly with application of a positive sign bit thereto. If the sign of said difference is positive, said difference is applied as indicated through data path "and" gate 41 to 2's complement circuit 45 to reverse the sign thereof, and is then applied as a negative difference through data path "or" gate 47 and data path "and" gate 49, upon delayed strobing of the latter, to adder 51. If said difference is negative, the same is applied as indicated through data path "and" gate 43 and "or" gate 47 and "and" gate 49 to adder 51 to thus, in either event, insure that said difference is negative as applied to said adder.

A buffer 52 is pre-loaded with a predetermined tolerance N and is operable as indicated to continually apply the same as the other input to adder 51. The tolerance N is predetermined to equal the minimum difference or increase which will qualify the most current data point 12 as a rise over the average of the four previous data points. Thus, delayed strobing as indicated of adder 51 from common strobe 22 will result in the addition of tolerance N and the necessarily negative difference from subtractor 48, with the sign bit of said sum being applied to sign bit comparator 53 along with the application of a positive sign bit thereto. If the sign bit of the sum from adder 51 is negative, or at least not positive, to thus indicate that the difference between DPo, or data point 12, and the average of the four previous data points exceeds or equals tolerance N to thus qualify DPo as a rise as discussed hereinabove, and if the difference from subtractor 48 was initially positive, "and" gate 55 is conditioned as indicated from sign bit comparators 39 and 53 to increment rise counter 54 and reset flat counter 56 to zero. If the sign bit of said sum is negative, or at least not positive, but the difference from subtractor 48 is initially negative to indicate what may be termed "negative rise" or a fall in curve 10, "and" gate 57 is conditioned from said sign bit comparator to simply reset flat counter 56 to zero. In the event that the sign bit of the sum from adder 51 is positive to indicate that the difference between $DP_o$ and the average of the four previous data points does not exceed the tolerance N in either of the positive or negative directions, to thus clearly indicate a flat on the curve 10 in that $DP_o$ does not qualify as a positive or negative rise, flat counter 56 is incremented directly from sign bit comparator 53.

The rise count is applied as indicated from rise counter 54 to ± rise detector comparator 58, while a pre-loaded buffer 60 containing a predetermined number L of rise counts which are required for a + rise, continually applies such number L as indicated to comparator 58.

The flat count is concomitantly applied as indicated from flat counter 56 to a flat detector comparator 62, while a pre-loaded buffer 64 containing a predetermined number M of consecutive data points which may vary by less than N to equal a flat, continually applied such number M as indicated to comparator 62.

Regardless of the magnitude and sign of the difference between the four previous data points and the most current data point, it may be seen that the reception of each analytical data point from the sample analysis channel will result in the appropriately delayed strobbing of the flat detector comparator 62 to trigger the latter. If, upon the reception of any such strobe, the flat count is equal to M, the comparator 62 will be effective to trigger rise detector comparator 58 to compare the rise count as applied thereto from rise counter 54 to L and to apply the results of said comparison as indicated to peak history buffer 68 for storage and subsequent curve monitoring function as described in detail hereinbelow.

The fact that the flat count has now become equal to M does, as discussed hereinabove, signify the conclusion of the rise monitoring function. Thus may be seen that the triggering of the rise detector comparator 58 from flat detector comparator 62 will result in the concomitant application as indicated of a pulse from the latter through "or" gate 78 and "or" gate 580 to trigger one shot multivibrator 578 and reset the three bit parallel register 80 to zero. Shortly thereafter, as determined by the operational time of the included delay, and regardless of whether the rise count is greater than, equal to or less than L, a pulse will be applied as indicated from "or" gate 78 to the 011 input of register 80.

The register 80 controls the output of octal decoder 44 as indicated through the conditioning by the former of flip-flops 84, 86 and 88 which are included in the former. This is to say that said decoder is operable to exclusively pulse a different one of the eight monitoring function determining "and" gates connected thereto in response to each of the eight possible conditions of the flip-flops 84, 86 and 88. Thus may be understood that with the register 80 now reloaded at the 011 input thereof, the slightly further delayed application as indicated of the pulse from "or" gate 78 as a strobe thereto through "or" gate 92 will result in said register conditioning flip-flops 84, 86 and 88 in such manner that octal decoder 44 will commence the exclusive pulsing of "and" gate 90 with resultant application of the next received reference corrected data point to the suggested value monitoring circuitry as described in detail hereinbelow.

Figure 9A:
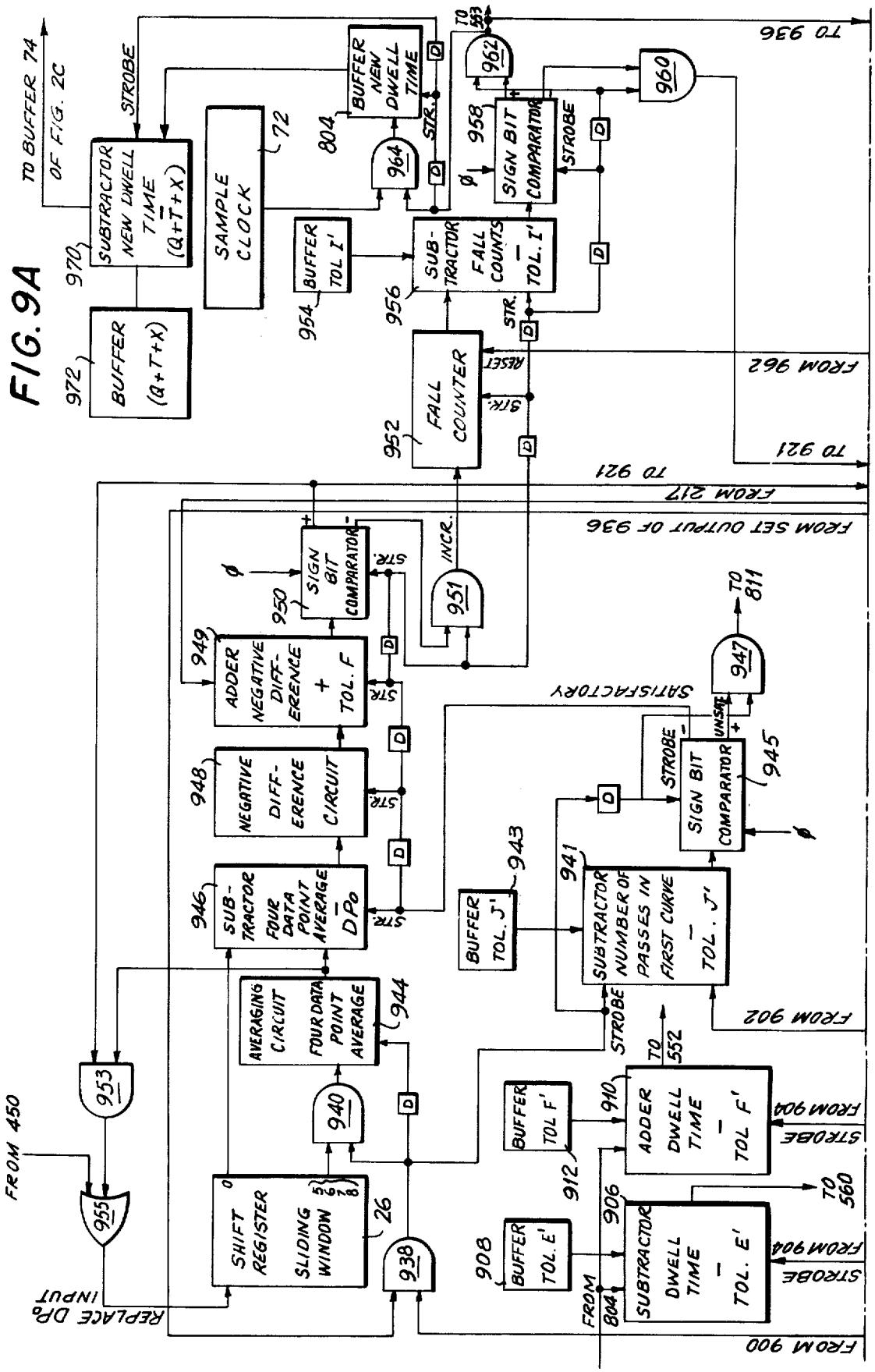

If on the other hand, upon triggering as described of the flat detector comparator 62 from common strobe 22, the flat count as applied to the former from flat counter 56 is less than M, said comparator 62 will be effective as indicated to apply a pulse to maximum rise time detector comparator 70 to determine if the other criteria for the conclusion of monitoring of the rise section of the curve, namely the expiration of the available time for rise monitoring, has been met. More specifically, it may be seen that a sample clock 72 for the dwell time DT2 of the sample of interest, which clock was started upon the commencement of aspiration of said sample into the analysis apparatus, is provided to continually apply said dwell time in real time to maximum rise time detector comparator 70. Also provided in a pre-loaded buffer 74 which is effective to apply the dwell time DT1 as determined during the most recent pass through the first curve monitoring circuitry of FIG. 9A as described hereinbelow, minus the sum of the tolerance Q, the time T required for one data point pass and the time X required for the given number P of data point passes which are needed for monitoring of the suggested value section of curve 10, respectively, to the comparator 70. The comparator 70 is effective as indicated to trigger rise detector comparator 58 to store the rise count in peak history buffer 68, and to terminate the monitoring of the rise section of the curve 10 through resetting of register 80 to zero as indicated through "or" gates 78, and 580, and one shot 578, to reload said register at the 011 input thereof, and to strobe the same through "or" gate 92, all as described hereinabove, only when DT2 is equal to DT−(Q+T+X) to indicate the expiration of the time available for the monitoring of the rise section of curve 10 for the sample of interest.

In the event that neither of the conditions FC=M or DT2=DT1−(Q+T+X) exist upon the respective triggerings as described of comparators 62 and 70, it may be understood that octal decoder 44 will continue to exclusively pulse "and" gate 42 with the result that the next reference corrected data point or data point 76 FIG. 1) will, along with data points 12, 28, 30 and 32, be applied as described from shift register 26 exclusively to the rise monitoring circuitry for processing.

Operation of the rise monitoring circuitry of the peak monitor is, of course, continuous as described on each successive data point until octal decoder 44 commences the exclusive pulsing of "and" gate 90 whereupon application of the succeeding reference corrected data points to the suggested value monitoring circuitry will be commenced.

Figure 3A:
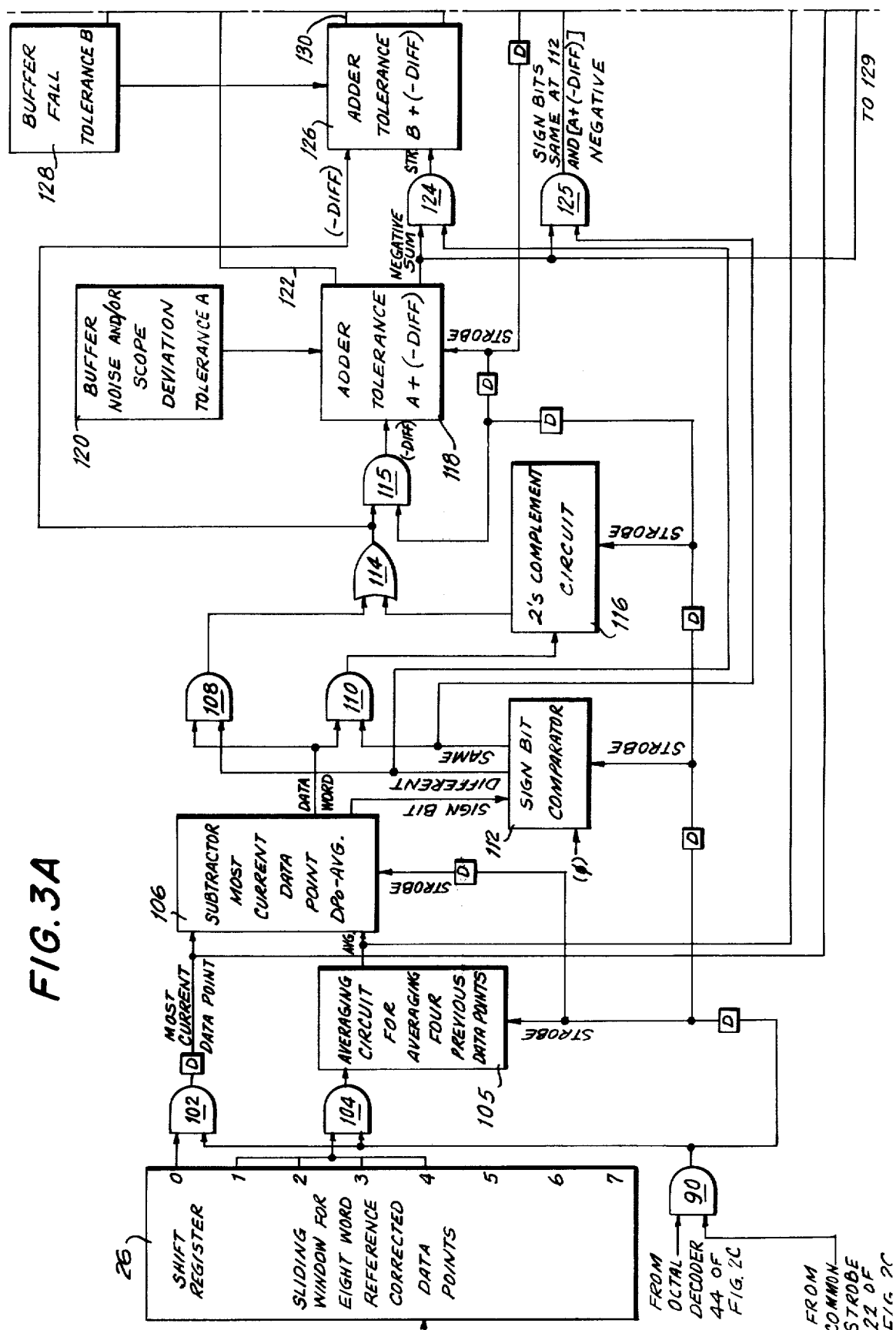

Referring now to FIGS. 3A and 3B, as the next reference corrected data point, or data point 100 (FIG. 1) is applied to shift register 26, it may be understood that the conditioning of data path "and" gates 102 and 104 through "and" gate 90 will be effective to respectively apply said data point in appropriately delayed manner to subtractor 106, and to apply the four previous data points, or data points 76, 12, 28 and 30 from the rise section of the curve 10 (FIG. 1) to data averaging circuit 105 for averaging upon delayed application of the strobe pulse from strobe pulse generator 22 (FIG 2C) thereto. This average is then also applied as indicated to subtractor 106 to commence the monitoring of the suggested value portion of the curve 10.

In general, it may be understood that such monitoring has two basic functions, namely to provide a semi-quantitative value for use if unacceptable deviation occurs in a subsequent portion of the curve 10 as might be caused by a short sample or the like, and to provide a frame of reference against which other portions of the curve may be compared to assess the validity of the results through judgement of the flatness of the curve when steady state conditions have been reached.

The monitoring of the suggested value portion of curve 10 lasts for a fixed duration from the end of rise portion monitoring. This duration is specific for each of the analytical blood chemistries involved, and should extend for at least four data points to be at least equal to that of the peak value derived at the fall of the curve 10. During the monitoring of the suggested value portion of curve 10, each data point is compared to the average of the four previous data points. If the most current data point under comparison is within the expected noise tolerance, or expected data point to data point variation for the chemistry of interest, no action is taken. If the data point is outside this normal variation, it is counted as a noise point. Moreover, if the data point is also below the average of the four previous data points derived at the end of the monitoring of the rise section of the curve 10, it is counted as a drop point.

When the suggested value monitoring time duration has expired, these abnormal point counters are checked. First, the drop counter is checked. If a number of drop counts occurred during this period, an abnormal premature drop is recognized and the curve is rejected. If a significant drop was not recognized, the number of noise counts is checked. If the required number of noise counts was achieved, this segment of the curve is labeled noisy, and the fact is stored for future use. If the segment was not noisy, this fact is also noted and stored. In either case, an average of the last four passes or data points is taken and stored as the suggested value monitoring average, and a switch to pre-window monitoring is made. It is to be noted that comparing the most current data point to the average of the four previous data points will permit the suggested value time to still have a slope if steady state is not yet reached. The degree of slope allowed is determined by the allowed difference between the most current point and the average of the previous four points. If the slope is too steep a noisy segment will result. If it is not too steep, a sloping suggested value is considered valid, subject to later comparisons with the peak value.

The application as described of the most current data point and the average of the four previous data points, in this instance data point 100 and the average of data points 76, 12, 28 and 30 (FIG. 1) to subtractor 106 will result, upon delayed strobing as indicated of the latter, of the subtraction of said average from said data point. The result of this subtraction, whether positive or negative or zero, is simultaneously applied as indicated as a multi-bit signed number to data path "and" gates 108 and 110, while the bit representing the sign of said difference, is also applied as indicated as one input to sign bit comparator 112. A positive sign bit is applied as indicated as the other input to said comparator which, upon delayed strobing thereof from strobe generator 22, is effective to condition data path gate 108 if the thusly applied sign bits are different to indicate a negative difference, or to condition data path "and" gate 110 if said sign bits are the same to indicate a positive difference. As a result, if said difference is negative, the same will be applied as indicated directly through "and" gate 108 to data path "or" gate 114. If said difference is positive, the same will be applied as indicated through "and" gate 110 to 2's complement circuit 116 for conversion of the sign, and application as a negative number to "or" gate 114, to thus insure that, in any event, the number applied to said "or" gate is a negative number. The delayed strobing of data path "and" gate 115 then results in the application as indicated of this negative difference to adder 118.

A tolerance A which is predetermined to equal the maximum allowable noise and/or slope deviation is constantly applied as indicated from buffer 120 as the other input to adder 118 for addition with said negative difference. If the result of said addition is positive or zero to thus establish that said difference does not exceed said tolerance, a pulse is provided as indicated on adder output 122 for subsequent utilization as described hereinbelow. If the result of such addition is negative, to thus indicate noise and/or excessive slope deviation, a pulse is applied as indicated by "and" gate 124 which, in conjunction with the pulse applied thereto as indicated from sign bit comparator 112 only in the event of a negative difference from subtractor 106 is effective to strobe adder 126 as indicated. In addition, under these conditions, a pulse is applied to "and" gate 125 which, in conjunction with a pulse applied thereto from sign bit comparator 112 as indicated in the event of a positive difference from subtractor 106, is effective to result in the application of a pulse on line 127 for subsequent utilization as described hereinbelow. Too with a negative sum from adder 118, a pulse is applied as indicated therefrom to increment noise and/or deviation counter 129.

Adder 126 operates to add a fall tolerance B which is constantly applied thereto as indicated from buffer 128, and the negative difference as is applied thereto from data path "or" gate 114. If the result of this addition is positive or zero to indicate that said difference does not exceed said tolerance, a pulse is provided on adder output 130 for subsequent utilization as described hereinbelow. If such result is negative, to thus indicate that said difference exceeds said fall tolerance and thus constitutes a fall, a pulse is applied as indicated to "and" gate 132 and is effective, in conjunction with a delayed pulse applied thereto as indicated from strobe 22, to strobe subtractor 134.

Subtractor 134 is effective to subtract the average of the four previous data points, or data points 76, 12, 28 and 30 from the rise section of curve 10 (FIG. 1) as applied thereto in delayed manner from averaging circuit 105, from the most current data point DPo, or data point 100, as applied thereto in delayed manner from register 26 and, in the event that the difference therebetween is positive or zero to indicate a rise or a flat, to provide a pulse on output line 136 for subsequent utilization as described hereinbelow. In the event said difference is negative to indicate a fall, said negative difference is applied as indicated to adder 138.

Adder 138 is effective, only in the event of a negative difference from subtractor 134 as is applied thereto through data path "and" gate 139, and upon appropriately delayed strobing as indicated from strobe 22 through "and" gate 143, to add this negative difference to tolerance B. If the result of this addition is positive or zero to indicate that tolerance B exceeds such difference and no fall has occurred, a pulse is provided on output line 140 for utilization as described hereinbelow. If such result is negative to indicate a fall, a pulse is applied as indicated from adder 138 to fall counter 142 to increment the same. This pulse is also applied as indicated on line 141 to "or" gate 143, as are each of the positive or zero difference result pulses from lines 122, 130, 136 and 140, and the pulse from "and" gate 125 on line 127, and it may be understood that each application of a pulse to said "or" gate will result in the advance as indicated of the number of passes counter 150. Said counter is, of course, set for the number of data point passes which is chosen to constitute the duration of the suggested value curve section monitoring function. Although said number is given as four by way of example hereinabove, the same way of course be greater than four.

Operation of the suggested value curve portion monitoring circuitry is continuous until the four data points of interest, namely data points 100, 144, 146 and 148 have been applied thereto and operated thereon as described. In each instance of data point application to the suggested value monitoring circuitry, it may be understood that, despite the magnitude and sign of the difference, if any, between the most currently applied data point and the average of the four previous data points, and despite the magnitude and sign of the difference, if any, between said first-mentioned difference and the respective noise and fall tolerances A and B, the suggested value monitoring circuitry is configured and operable as described in such manner that each application of a data point thereto will, of necessity, ultimately result in advance of the counter 150. Thus, and following the processing of data point 148 (FIG. 1) counter 150 will provide a pulse on the "3" output thereof for application as indicated to strobe fall count comparator 152 with resultant comparison thereby of the actual number of fall counts from fall counter 142 with the maximum allowable number C of fall counts as applied to said comparator from buffer 154.

In the event the actual number of fall counts is greater than or equal to C, comparator 152 will pulse peak history buffer 68 to add a reject bit to the history of curve 10 to thereby reject the same as indicative of invalid analysis results, and will pulse counter 150 to reset the same to zero as indicated. If said fall count is less than C to thereby indicate less than the allowable number of falls, a pulse is applied instead as indicated from comparator 152 to "and" gate 156. This pulse is effective, in conjunction with the appropriately delayed application of the strobe pulse as indicated from counter 150 to "and" gate 156 to strobe noise count comparator 158.

Noise count comparator 158 is effective to compare the maximum number of allowable noise counts D from buffer 160 with the actual number of noise counts which have in fact occurred from noise counter 129.

In the event the actual number of noise counts is greater than or equal to D to thus indicate an excessively noisy and/or deviant suggested value curve portion, a pulse is applied as indicated from comparator 158 to peak history buffer 68 to add a reject bit to the curve history for reasons set forth hereinabove. Said pulse is also applied as indicated through "or" gate 162 to reset counter 150 to zero. If, on the other hand, the actual noise count is less than D, a pulse is simply applied as indicated through "or" gate 162 to reset counter 150 to zero.

A buffer 161 is provided for the storage of the average of the four previous data points, or data points 76, 12, 28 and 30 of the rise section of the curve 10 (FIG. 1) from averaging circuit 105, and said average is applied thereto as indicated through data path "and" gate 163 upon conditioning of the latter from the "0" output of the counter 150 and appropriately delayed strobe from strobe generator 22.

The appearance of a pulse at the output of "or" gate 162 is also effective, through "or" gate 580 and one shot 578, to reset register 8 (FIG. 2C) to zero, and to then re-load said register as indicated at the 100 input thereof. The subsequent strobbing of 3 bit register 80 as indicated from "or" gate 162 through "or" gate 92 will thus be effective to cause said register to condition flip-flops 84, 86 and 88 (FIG. 2C) in such manner that octal decoder 44 will commence the exclusive pulsing of "and" gate 164 (FIG. 2C) with resultant application of the next reference corrected data point, or data point 166, to the pre-window monitoring circuitry.

Referring now to FIGS. 4A, 4B, 4C and 4D, respectively, description of the pre-window curve portion monitoring function of the invention, it may be understood that the primary purpose of this function is to continue the monitoring of the curve 10 to detect what should normally be a generally flat curve portion while continually observing the latter for noise or a premature drop therein. Thus, as the first data point for pre-window, or data point 166 (FIG. 1) appears at the output of sliding window 26, the same will be applied in appropriately delayed manner through data path "and" gate 202, as conditioned from "and" gate 164, to subtractor 210. Concomitantly, the previous four data points, or data points 148, 146, 144 and 100 (FIG. 1) which are the last four data points from suggested value, will be applied through data path "and" gate 200, also as conditioned from "and" gate 164, to four data point averaging circuit 204 and the average thereof also applied as indicated to subtractor 210. In addition, the average of said previous four data points will be applied as indicated from averaging circuit 204 to buffer 206 upon strobing of data path "and" gate 207 from latch 205 in response to the conditioning of "and" gate 164.

Delayed strobing of subtractor 210 from common strobe 22 as indicated will result in the difference between said most current data point and said previous data point average being applied as a multi-bit word to data path "and" gates 211 and 213, and in the sign bit of said word being applied to sign bit comparator 212. A plus sign bit is also applied to comparator 212. If the sign bit of said difference is positive, gate 213 is conditioned and said difference applied to 2's complement circuit 234 to render the same negative for application through data path "or" gate 214 to data path "and" gate 215, with the latter being conditioned as indicated from common strobe 22 to apply the negative difference to adder 218. If said difference is negative initially, the same is applied through gate 211, which is conditioned as indicated from comparator 212, through gates 214 and 215 to adder 218.

An expanded slope and noise tolerance E is also applied to adder 218 from buffer 219, whereupon the strobing of the former as indicated will result in the addition of tolerance E to the negative difference from subtractor 210. If the result of such addition is zero or positive to indicate that said difference does not exceed said tolerance, a pulse is applied through "or" gate 220 and, after an appropriate delay, utilized to strobe comparator 252.

One input to comparator 252 is provided from the sample clock 72, and the other from buffer 250 in the form of a tolerance H or the maximum allowable time for pre-window curve portion monitoring. If the sample clock input is less than tolerance E, the pre-window monitoring circuitry simply waits for the next pass as indicated. If the reverse is true, register 254 is strobed as indicated from comparator 252 and the average of the last four data points applied as indicated from averaging circuit 204 to register 254 and stored therein as the pre-window value, it being understood that such would not normally occur on the first pass through pre-window.

In addition to the above, it may be understood that if the sum of the tolerance E and the negative difference from adder 218 is zero or positive, a pulse will be applied through "or" gate 224 to clear drop counter 228 since such sum indicates that the current data point 166 of interest does not constitute a drop.

If the sum from adder 218 is negative, to indicate that the negative difference from subtractor 210 exceeded tolerance E and that either positive or negative noise is present, a pulse is directly applied as indicated to increment noise counter 222 and, if the sign bit applied to comparator 212 is negative, "and" gate 232 is conditioned as indicated to strobe adder 216. In addition, a negative sum from adder 218 will also function as indicated to strobe comparator 252 through "or" gate 220 for operation of the former as described hereinabove to determine if the most current data point DP$o$ being monitored results from the last pass of the pre-window monitoring circuitry.

A drop tolerance F is applied as indicated from buffer 217 as one input to adder 216, while the negative difference from subtractor 210 is applied from the output of data path "or" gate 214 as the other input thereto for addition with tolerance F. If the sum from adder 216 is positive or zero to thus indicate that the current data point DP$o$ is not a drop, a pulse is applied as indicated through "or" gate 224 to clear drop counter 228 and re-start the counting of the number of successive drops at zero. If the sum from adder 216 is negative, subtractor 236 is directly strobed to subtract the current data point from the suggested value average as indicated. The result of such subtraction is applied as indicated directly to adder 240, while the sign bit of said result or difference is applied as indicated to sign bit comparator 238. If, and only if, said sign bit it negative, a pulse is applied from comparator 238 to strobe adder 240 to add said negative difference to tolerance F, and the sign bit of the resultant sum applied as indicated to a sign bit comparator 242. If, on the other hand, the sign bit applied to sign bit comparator 238 is positive, to indicate that the current data point DP$o$ does not exceed the suggested value average in buffer 206, adder 236 is not strobed and no further use is made of the difference from subtractor 236.

If the sign bit of the sum from adder 240 is positive, to indicate that the negative difference from subtractor 236 does not exceed tolerance F and thus does not constitute a drop, a pulse is applied as indicated from sign bit comparator 242 through "or" gate 224 to again clear the drop counter 228. If, on the other hand, said negative difference does exceed tolerance F to thus indicate a drop, a pulse is applied from sign bit comparator 242 to increment the drop counter 228 and, after an appropriate delay to enable such incrementing, is applied as indicated to strobe subtractor 244.

A buffer 245 applies the number of allowable successive drop counts in the form of a tolerance G as one input to subtractor 244, while the other input thereto is provided by the number of successive drop counts in the drop counter 228. If the latter count is equal to or greater than said tolerance, a pulse is applied as indicated from subtractor 244 to latch 246 for storage of an indication of such excess.

To briefly summarize the operation of the pre-window monitoring circuitry to this point, it is believed made clear that the difference between each current data point and the average of the four previous data points (which for the first pre-window data point 166 of FIG. 1 would always be the last four data points from suggested value, and which in subtractor 236 are always the average of the last four data points from suggested value) is compared in turn to tolerance E to determine if excessive noise exists and to tolerance F to see if it constitutes a drop, it being understood that "noise" may be constituted by positive or negative deviation between said data point and the relevant data point average, and that it could be possible to have noise without having a drop, and impossible to have a drop without also having noise.

Upon the determination by comparator 252 that the most current data point DP$o$ is the last pass for pre-window monitoring, with attendant strobing of register 254 to store the average of the four previous data points from averaging circuit 204, comparator 258 of FIG. 4D is strobed as indicated to "compare" the reject bit from peak history buffer 68 against a true level from register 259. If said reject bit has been set in peak history buffer 68 as described in detail hereinabove, "or" gate 292 is pulsed to increment a "short sample counter" which is provided as indicated in channel history buffer 260. In addition, "or" gate 308 is pulsed as indicated after an appropriate delay to strobe subtractor 266.

A tolerance I which is the number of allowable successive specific errors is applied as one input to subtractor 266, and the number of successive short sample counts from channel history buffer 260, as applied to subtractor 266 through appropriately conditioned "and" gate 310, is subtracted from said tolerance in said subtractor. If the result of such subtraction is negative to indicate that the number of short samples is excessive, channel inactive latch 284 is set as indicated through "or" gate 282 and the channel of interest rendered inactive, it being understood that latch 284 can only be cleared on command from the executive control circuitry 20 of FIG. 2C. Rendering of the channel inactive is indicated to the operator of the analysis apparatus and is, of course, effective to discontinue further operation thereof and, as follows, to discontinue the provision of the analysis results which form curve 10 of FIG. 1.

A positive result or difference from subtractor 266, which indicates that the number, if any, of successive short samples does not exceed the allowable maximum, is effective as indicated to strobe subtractor 268 to effect the subtraction of the total history count, or the successive channel errors of all types, as applied to subtractor 268 from channel history buffer 260, from the allowable number of successive channel errors of all types, or tolerance J, as applied to subtractor 268 from buffer 270. If the former exceeds tolerance J as indicated by a negative result from subtractor 268, which in turn indicates excessive channel malfunctions, channel inactive latch is set through "or" gate 282. If the number of channel errors of all types does not exceed tolerance J, a positive result from subtractor 268 will occur to indicate that the channel operation is, to this point, still satisfactory although the sample of interest is rejected. As a result, monitoring of the window portion of the curve 10 for this sample will not be effected as described in greater detail hereinbelow. Under these conditions, a pulse is applied as indicated from subtractor 268 through the appropriately conditioned "and" gate 273 to adder 272 to strobe the latter.

One input to adder 272 is provided from buffer 280 in the form of a tolerance H which is a negative rise time minus a negative dwell time tolerance, while the other input to adder 272 is provided from buffer 274 in the form of a tolerance K which is the minimum allowable rise time. This addition of tolerances H and K in adder 272 provides the minimum rise time which is applied as indicated to buffer 278 upon appropriately delayed strobing of the latter from subtractor 268. In addition, a positive result from subtractor 268 is effective as indicated to pulse "or" gate 92 and 110 input of register 80 (FIG. 2C) for housekeeping use of the next data point it being understood that pulsing of the 110 input of register 80 will instruct the peak monitoring circuitry of the invention to assume what may be termed the "to go next sample" state. The fact that the 110 rather than the 101 input of register 80 is pulsed is believed to make clear that, under the above-described rejected sample conditions, monitoring of the window portion of curve 10 will not take place.

Returning now to comparator 258, it may be understood that if no reject bit were applied thereto from peak history buffer 68 to thus indicate that the curve 10 for the sample of interest has not been previously rejected, "and" gates 286 and 294 are pulsed as indicated. If an indication of excessive drops is set in latch 246, "and" gate 286 is conditioned to pulse "and" gate 288. Thus, the presence of a satisfactory suggested value bit in peak history buffer 68 will be effective to condition data path "and" gate 290 through gate 288 to apply the suggested value average as indicated from buffer 206 through data path "and" gate 290 and "or" gate 538 to the baseline correct circuitry as includes subtractor 352. In addition, the conditioning as described of "and" gate 288 is effective as indicated to inform the executive control circuitry 20 of this application of the suggested value average, and to strobe subtractor 352.

Figure 5B:
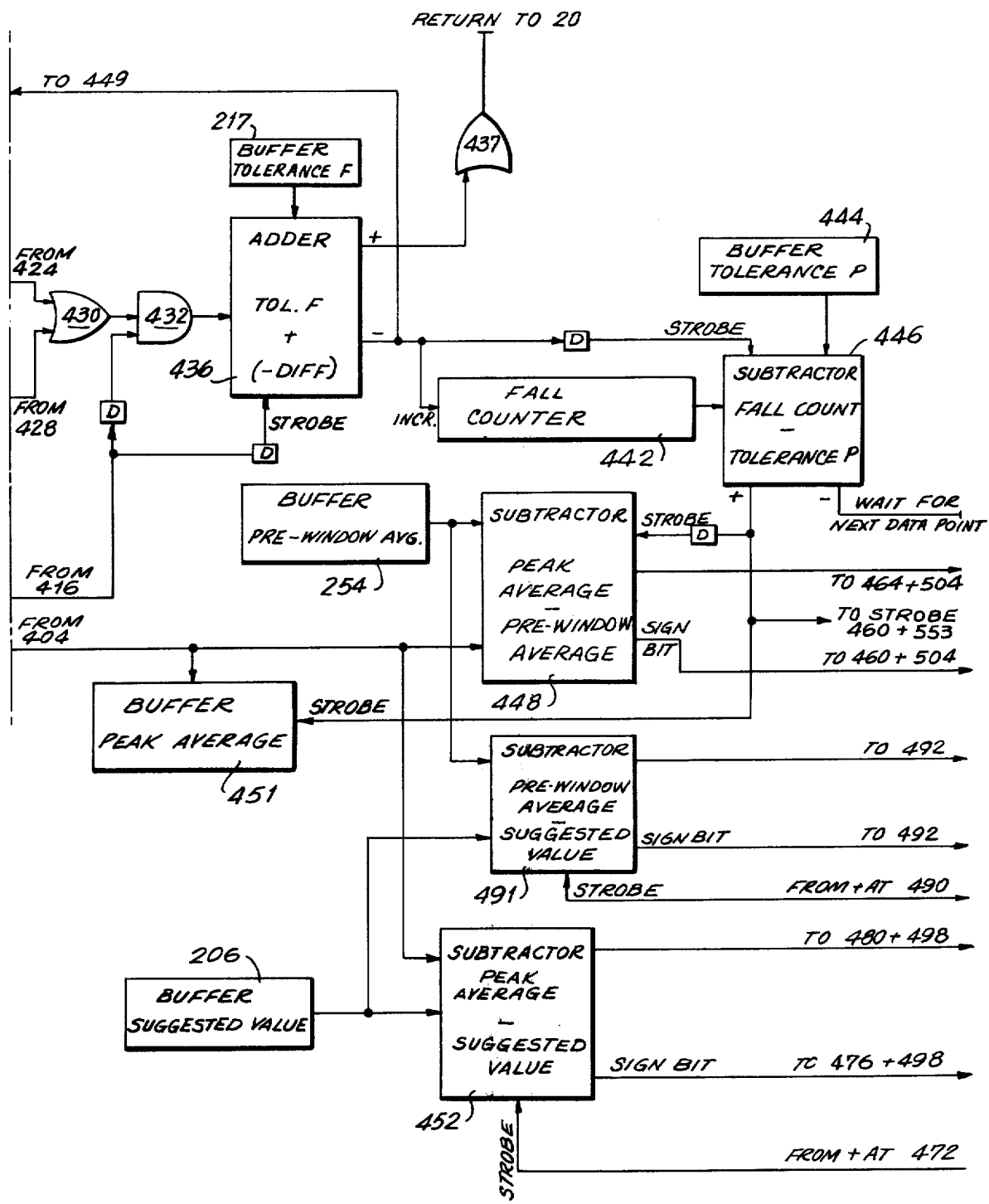

The suggested value from buffer 206 may also be applied as indicated through "or" gate 538 (FIG. 5D) in the manner described in detail hereinbelow in the description of the window monitoring function, as an input value to subtractor 352. Alternatively, this input value may be constituted by the pre-window value from buffer 254 (FIG. 4B) or the peak value from buffer 450 (FIG. 5B). This input value is, in any event, subtracted from the current baseline value of buffer 312 upon strobing of subtractor 352 as indicated from "or" gate 539. The resultant difference which is the baseline corrected value, is applied as indicated through data path "and" gate 356, to the executive control circuitry 20 of FIG. 2C.

In the event that no reject bit is applied from buffer 68 to comparator 258, and there is no indication of excessive drop counts in latch 246, "and" gate 294 is conditioned as indicated to strobe divide-by-two circuit 296 which applies one half of the number of pre-window passed from pre-window pass counter 256 as one input to subtractor 300. The number of noise counts is applied as indicated as the other input to said subtractor is applied as indicated as the other input to said subtractor and one half of the number of said pre-window passes subtracted therefrom. Subtractor 300 is strobed in delayed manner from "and" gate 294 and, if the result of the operation thereof is positive to indicate more noise counts than allowable (or more than half of the number of pre-window passes), and there is no suggested value reject bit in buffer 68 (to thus indicate a noisy pre-window curve segment but a good suggested value segment), "and" gate 322 is conditioned as indicated to pulse "or" gate 324 to strobe averaging circuit 310 for averaging, for the first time, of the most current data point which may, for example, be data point 366 of FIG. 1, with the three previous data points, or data points 364, 362 and 360. Thus is provided an average of pre-window data points, only.

This pre-window average is applied as indicated from averaging circuit 310 as one input to subtractor 314 and is subtracted therein from the current base line value from buffer 312 upon delayed strobing of said subtractor as indicated from "or" gate 324. This pre-window average is also stored in averaging circuit 310 until the next strobing thereof. The result from subtractor 314, which is a base line corrected pre-window average, is applied as indicated as one input to subtractor 318, and a tolerance L which is a minimum normal deflection from baseline tolerance, is applied to said subtractor from buffer 316. The tolerance L is subtracted as indicated from the base line corrected pre-window average in subtractor 318 upon delayed strobing thereof from "or" gate 324. If the result of such subtraction is negative to indicate that said average is too close to the base line, an appropriate counter is incremented as indicated in channel history buffer 260, and "and" gate 314 is conditioned as indicated to gate the too close to base line count into subtractor 266 and to pulse "or" gate 308 to strobe said subtractor. The operation of subtractor 266 under these conditions is the same as described hereinabove with regard to the short sample count determination, it being understood that an excessive too close to base line count as will be indicated by a negative result from subtractor 266, will result in setting of channel inactive latch 284, while the fact that said count is not excessive, as will be indicated by a positive result from subtractor 266, will result in operation of subtractor 268 and setting of buffer 278.

Returning to the operation of subtractor 300, it may be understood that if the result therefrom is positive to indicate an excessive number of noise counts, and if there is a reject bit in the suggested value information in peak history buffer 68 to prevent the conditioning of "and" gate 322, and strobing of averaging circuit 310, inverter 302 will change the "0" level on line 301 to a "1" or true level to condition "and" gate 304 to increment as indicated the noise counter in channel history buffer 260 to condition "and" gate 312 as indicated to apply the noise count from buffer 260 as one input to subtractor 266. The subsequent, delayed strobing of subtractor 266 from "and" gate 304 through "or" gate 308 will again result in operation of said subtractor as described hereinabove, it being understood that excessive noise counts will effect setting of channel inactive latch 284, and that less than excessive noise counts will result in operation of subtractor 268.

If the result from subtractor 300 is negative to indicate less than an excess number of noise counts and a good pre-window curve segment, averaging circuit 310 is strobed as indicated through "or" gate 324 and operates as described hereinabove, as do subtractors 314 and 318.

The strobing of subtractor 326 in response to a positive result from subtractor 318 (which indicates that the curve in question has not yet been rejected) operates to effect the subtraction of the pre-window average from averaging circuit 310 from the suggested value average from buffer 206, with the result of such subtraction being applied as indicated to data path "and" gates 334 and 336. The sign bit of said result is applied as indicated to sign bit comparator 328. If positive, "and" gate 334 is conditioned by the output of said comparator for gating of said result into 2's complement circuit 332 and application thereof as a negative number through data path "or" gate 338 to data path "and" gate 340. If said result is negative, "and" gate 336 is conditioned by the resultant output of comparator 328 to gate said result to "and" gate 340 through "or" gate 338.

"And" gate 340 is conditioned as indicated in appropriately delayed manner to gate the negative result from subtractor 326 as one input to adder 346 for addition therein with a tolerance M which defines the criteria for the outer envelope of a flat. If the result of such addition is negative, to indicate that the difference or variation between the suggested value and pre-window averages exceeds the permissible tolerance, the curve is rejected through incrementation of the out-of-tolerance count in the channel history buffer 260, and the out-of-tolerance count then gates from the latter into subtractor 266 through appropriately delayed conditioning of "and" gate 348. "Or" gate 308 is then pulsed as indicated to strobe subtractor 266 for operation as described hereinabove and resultant setting of channel inactive latch 284 if the incremented out-of-tolerance count is equal to or greater than the maximum allowable therefor.

If the result of the operation of adder 346 is positive, to thus indicate acceptable deviation between the suggested value and pre-window averages, a pulse is applied as indicated to clear each of noise counter 222, latch 246, pre-window pass counter 256, Latch 205 and counter 228, and to reset register 80 (FIG. 2). In addition, a pulse is applied as indicated to re-load register 80 at 101 input thereof and to reset and strobe said register through pulsing of "or" gates 580 and 92 (FIG. 2C). As a result, it may be understood that octal decoder 44 of FIG. 2C will now commence the exclusive pulsing of "and" gate 368, whereupon the next data point to arrive at the peak monitoring circuitry of the invention (data point 370 of curve 10 of FIG. 1) will be applied to the window monitoring portion of said circuitry.

Prior to detailed description of the monitoring of the window portion of the curve 10 (FIG. 1), it is reiterated here that such monitoring will occur for the current sample of interest if no significant drop in the curve was detected during the monitoring of the rise portion of the curve, only if excessive noise was not detected during the monitoring of both the rise and pre-window portions of the curve, and only if the current running average of the curve is not determined to be close to baseline, respectively, all as described in detail hereinabove. It is, of course, the overall function of curve window portion monitoring to detect the peak curve value which is mot representative of the concentration of the sample constituent of interest, and to report such peak value as the output of the automated analysis apparatus for the relevant apparatus channel.

Referring now to FIGS. 5A, 5B, 5C and 5D, respectively, it may be seen that as the first data point for window, or most current data point 370 of curve 10 of FIG. 1, is applied to the monitoring circuitry of the invention, data path "and" gates 400 and 402 are respectively enabled as indicated from "and" gate 368 (FIG. 2C) to apply said data point from the sliding window 26 to subtractor 418, and to apply the least previous data points, or data points 360, 166, 148 and 146, to four data point averaging circuit 404 for averaging and subsequent application as the other input to said subtractor.

Concomitantly, the last computed dwell time as stored in buffer 410, and a tolerance Q, or positive tolerance on said dwell time, as stored in buffer 408, are applied as indicated to adder 412, for addition upon strobing of the latter from "and" gate 406, to provide the maximum allowable dwell time for this sample, or the maximum allowable window time. This result is subtracted as indicated in subtractor 416 from the sample clock time, or the time that the sample of interest has been resident in the system as timed from the point of sample aspiration, as stored in buffer 72 (FIG. 2B), upon delayed strobing as indicated of said subtractor. If the result of this subtraction is positive, no further use is made of data point 370, and the monitoring circuitry simply waits for the next data point.

If the result of this subtraction is negative to indicate that the time of sample residence has not exceeded the maximum allowable window time, subtractor 418 is strobed to subtract the average of the four least current data points from the current data point 370 (FIG. 1). If this result is negative, it is applied through data path "and" gate 424, as enabled from sign bit comparator 420, to "or" gate 430 and therefrom to data path "and" gate 432, which is enabled as indicated in delayed manner from subtractor 416, to thus apply the negative result or difference to adder 436. If said result is positive, the same is converted to a negative difference through operation of sign bit comparator 420 and 2's complement circuit 428, in the manner described in detail hereinabove, for the suggested value monitoring function, and said negative difference applied as described through data path "and" gate 432 to adder 436.

Upon delayed strobing, as indicated of adder 436, the same operates to add the tolerance F or the drop trigger tolerance from buffer 217 of FIG. 4A to the negative difference from subtractor 418. If the result is positive, to indicate that the magnitude of said difference was not outside the drop trigger tolerance, this fact is relayed as indicated through "or" gate 437 to the executive control circuitry 20 of FIG. 2C.

If the result from adder 436 is negative to indicate that the most current data point-four least current data points average difference is outside the drop trigger tolerance, fall counter 442 is incremented and subtractor 446 strobed to subtract tolerance P on the number of successive drops greater than tolerance F which will define a fall in curve 10 (FIG. 1) as stored in buffer 444, from the fall count. If the result of this subtraction is negative to indicate that the fall has not yet occurred, the peak monitoring circuitry of the invention simply waits as indicated for the next data point.

Returning to adder 436, it may be understood that if the result there is negative, and if the difference from subtractor 418 was initially negative to indicate that the average exceeded the most current data point and that the latter was a drop, "and" gate 449 is enabled to enable data path "and" gate 450 to substitute, through data path "or" gate 955, the average of the four least current data points for the most current data point in sliding window 26 with resultant discarding of said most current data point from said sliding window. This will only occur, of course, if the result from subtractor 418 is initially negative.

If the output of subtractor 446 is positive to indicate that the expected fall in curve 10 has occurred, buffer 451 is strobed to accept the average from averaging circuit 404 as the peak value or average of the curve 10 for the sample in question. In addition, subtractor 448 is then strobed in delayed manner to subtract the pre-window average as stored in buffer 254 (FIG. 4) from said peak value.

Figure 5C:
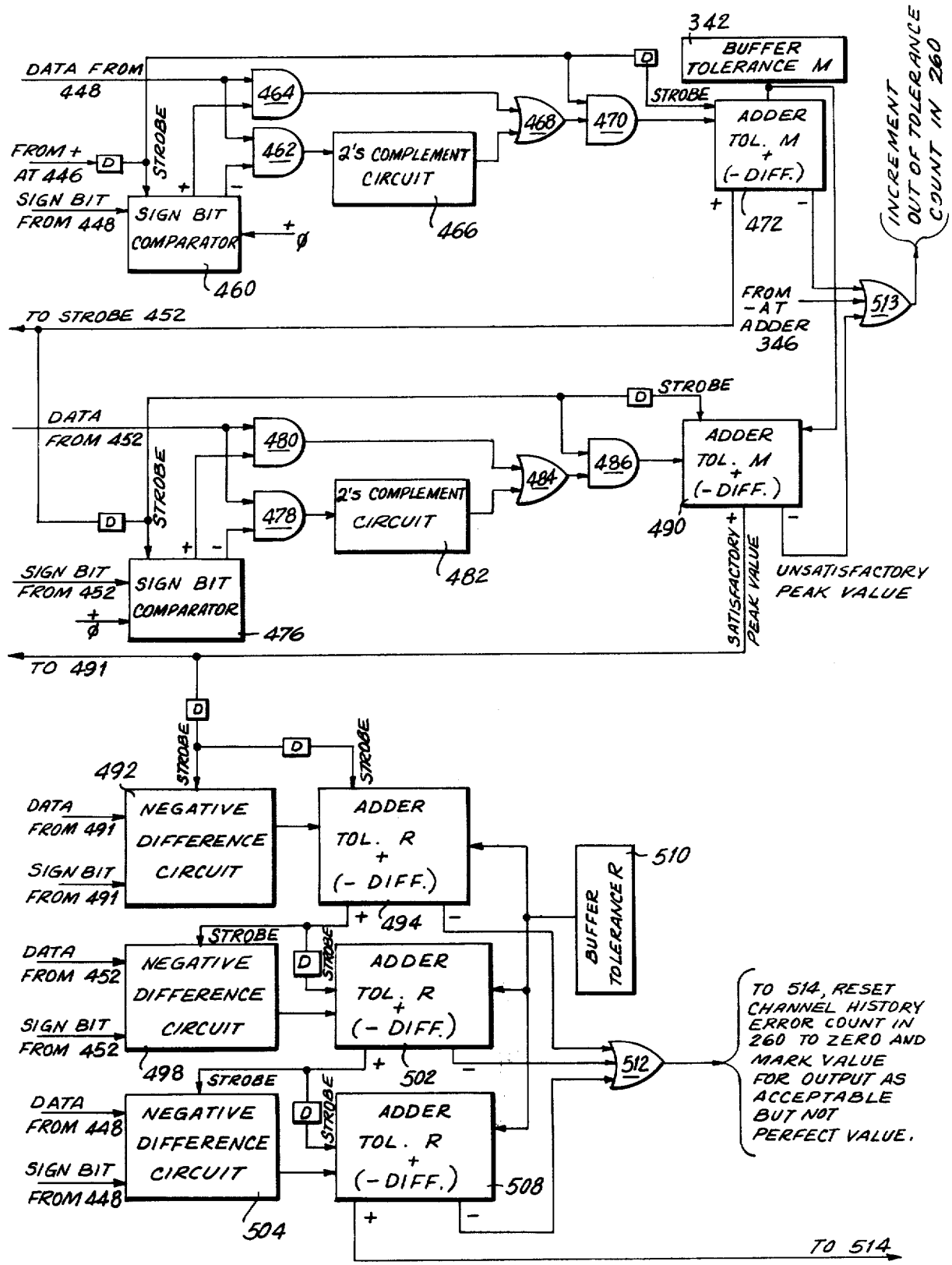

Referring now to FIG. 5C, it may be seen that the data word output from subtractor 448 is applied to data path "and" gate 464 while the sign bit of said output is applied to sign bit comparator 460. Operation as described hereinabove, for like components, of comparator 460, "and" gates 462 and 464, 2's complement circuit 466 and data path "or" gate 468 and "and" gate 470, respectively, will insure that the data word output or difference from subtractor 448 will be applied as a negative difference to adder 472. Delayed strobing of adder 472 operates the same to add a tolerance M or pre-window outer envelope as stored in buffer 342 to said negative difference. If the result is positive to indicate that the peak value and the pre-window value are within said outer tolerance of each other, subtractor 452 (FIG. 5B) is strobed as indicated to subtract the suggested value as stored in buffer 206 (FIG. 4C) from the peak value average from buffer 451. The data word output from subtractor 452 is applied as indicated to data path "and" gate 480, while the sign bit therefrom is applied as indicated to sign bit comparator 476; with the operation of the latter and of "and" gate 478, 2's complement circuit 482, and data path "or" gate 484 and "and" gate 486, respectively, functioning as previously described to insure the application of said difference in negative form to adder 490.

Delayed strobing of adder 490 as indicated will result in the addition of said negative difference to tolerance M. If the result of such addition is positive to indicate that the peak and suggested values are within the outer tolerance envelope of each other, it may be understood to have been determined that each of the pre-window, peak and suggested values are acceptable. In the event of this positive result, subtractor 491 is strobed as indicated from adder 490 to subtract the suggested value from the pre-window average.

The data word and sign bit of the result of this subtraction are applied as indicated to what will hereinafter be identified as a negative difference circuit, in this instance negative difference circuit 492, and which may be understood to comprise three "and" gates, an "or" gate, a sign bit comparator and a 2's complement circuit interconnected as described in detail a number of times hhereinabove. Negative difference circuit 492 insures the application of the result or difference from subtractor 491 in negative form to adder 494, wherein said difference is added as indicated to a tolerance R or inner envelope of a flat criteria from buffer 510.

If the output of adder 494 is positive to indicate that the pre-window and suggested values are within tolerance R of each other, negative difference circuit 498 is strobed as indicated to insure the application of the difference from subtractor 452 in negative form to adder 502 for addition therein with tolerance R.

A positive result from adder 502 will indicate that the peak and suggested values are within tolerance R of each other, and will be effective to strobe negative difference circuit 504 to insure the application of the difference from subtractor 448 in negative form to adder 508 for addition therein with tolerance R upon delayed strobing of said adder as indicated from adder 502. A positive result out of adder 508 will indicate that each of the pre-window, peak and suggested values are within the inner envelope tolerance R of each other and indicates a perfect curve by pulsing "or" gate 514 of FIG. 5D to output an appropriate comment and value to the executive control circuitry 20 of FIG. 2C as described in detail hereinbelow.

A negative result from any of the adders 494, 502 or 508 will function as indicated to pulse "or" gate 512 to reset the entire channel history buffer 260 (FIG. 4D) to zero and it may be understood that any such negative result will establish that although each of the suggested, peak and pre-window values are within the outer envelope tolerance M of each other, at least one of said values is without the inner envelope tolerance R to thus denote an acceptable but not perfect curve 10 up to this point.

Returning now to adders 472 and 490, it may be understood that a negative result from either of the same, will function to increment the out of tolerance count input of channel history buffer 260 through "or" gate 513 to thus make clear that said channel history buffer can be incremented during either pre-window or window monitoring with the same result. This is to say that, upon incrementation of the out of tolerance input of channel history buffer 260 during window monitoring, the same sequence of events will occur as described in detail hereinabove with regard to pre-window monitoring with the result that if "or" gate 92 and one shot 598 are ultimately pulsed from gate 273 to respectively reset and strobe register 80, and the latter reloaded as described at the 110 input thereof the channel in question will not be deactivated, but rather, octal decoder 44 will commence the exclusive pulsing of "and" gate 600 to apply the next data point to the next sample monitoring circuitry.

Returning now to adder 508 of FIG. 5C and referring now to FIG. 5D, it may be understood that a positive result from said adder will be effective to strobe "or" gate 514 to initiate the provision of output of the curve value most representative of the concentration of the constituent of interest in the present sample to the executive control circuitry 20 of FIG. 2C.

The determination of this curve value of interest is a major function of the window monitoring circuitry and involves the use of the positive and negative rise criteria as stored in the peak history buffer 68 of the rise monitoring circuitry of FIG. 2B. In the event of a positive rise, it may be understood that the largest of the respective peak, suggested and pre-window values is always outputed to the executive control circuitry 20 as the most representative curve value. If peak history buffer 68 indicates a negative rise, the peak value is always outputed to the executive control circuitry as said most representative curve value. The criteria used in determining which of the pre-window, peak or suggested values is the largest are as follows. A negative output from subtractor 448 and attendant negative indication at negative difference circuit 504 of necessity establish that the pre-window value is larger than the peak value, while a positive output and indication at said subtractor and difference circuit establish that the peak value is larger than the pre-window value. In like manner, a negative output from subtractor 491 and a negative indication at negative difference circuit 492 of necessity establish that the suggested value is larger than the pre-window value, while a positive output and indication at said subtractor and difference circuit establish the opposite. Similarly, a negative output from subtractor 452 and a negative indication at negative difference circuit 498 of necessity establish that the suggested value is larger than the peak value, while a positive output and indication at said subtractor and negative difference circuit establish the opposite.

An additional important function of the window monitoring circuit is to provide a qualifying or descriptive comment to the executive control circuitry to qualify or describe the provided most representative curve value.

More specifically, it may be seen that a positive rise in peak history buffer 68 will condition "and" gates 516 and 518 of FIG. 5D.

A concomitant positive indication from negative difference circuit 492 which establishes that the pre-window is larger than the suggested value, will enable "and" gate 516 to condition "and" gates 520 and 524. Thus, if the indication from negative difference circuit 504 is negative, "and" gate 520 will be enabled to condition "and" gate 522. As a result, the strobe from "or" gate 514 will be effective to enable "and" gate 522 to apply the pre-window value from buffer 254 (FIG. 4B) to "or" gate 538.

With a positive rise indication in buffer 68, and positive indications from negative difference circuits 492 and 504, which establish that the peak value is larger than the prewindow value, "and" gate 524 is enabled to enable "and" gate 526 to apply the peak value to "or" gate 538.

Positive rise indication in peak history buffer 68 (FIG. 2A) and a negative indication at negative difference circuit 492, which establishes that the suggested value is larger than the pre-window value, will enable "and" gate 518 and condition data path "and" gates 532 and 528. Thus, with positive indication at negative difference circuit 498, which establishes that the peak value is larger than the suggested value, "and" gate 528 and data path "and" gate 530 are enabled in conjunction with the strobe from "or" gate 514 to transmit the peak value to "or" gate 538.

Conversely, with positive rise and a negative indication at negative difference circuit 498, which establishes that the suggested value is larger than the peak value, "and" gate 532 and data path "and" gate 534 are enabled to apply the suggested value to data path "or" gate 538.

In the event of a negative rise indication at peak history buffer 68, "and" gate 536 is conditioned and subsequently enabled by the strobe from "or" gate 514 to transmit the peak value from buffer 451 (FIG. 5B) to the "or" gate 538, it being understood that this peak value is the only value which can be transmitted to "or" gate 538 under negative rise conditions.

The value which is applied as described to data path "or" gate 538, be it the peak, suggested or pre-window value, is then applied as indicated to subtractor 352 of the baseline correct circuit (FIG. 4D). This subtractor is then strobed as indicated from "or" gate 514 through "or" gate 539 to subtract said value from the current baseline value as stored in register 312 (FIG. 4C). The result of this subtraction is applied as indicated to data path "and" gate 356 (FIG. 4D) which is then also strobed in delayed manner from "or" gate 539 to enable the former to transmit the now baseline corrected more representative curve value to the executive control circuitry 20 of FIG. 2C.

A qualifying or descriptive message is transmitted concomitantly with this value to said executive control circuitry in the following manner. In the event of a positive output from subtractor 446 (FIG. 5B) which indicates that a fall did occur in the curve 10, or in the event of determination of a fall during first curve monitoring as described in detail hereinbelow, subtractors 554 and 562 (FIG. 5D) are strobed as indicated through "or" gate 553. Subtractor 554 subtracts the maximum dwell time as stored in register 552 from the sample clock time as stored in sample clock 72 (FIG. 2B) while the subtractor 562 subtracts the minimum allowable dwell time as stored in register 560 from said sample clock time. This same strobe is delayed and then utilized as indicated to strobe sign bit comparators 555 and 561. If the outputs of subtractors 554 and 562 are respectively negative and positive, "and" gate 563 is enabled through sign bit comparators 555 and 561 to condition "and" gate 570.

A positive output from subtractor 554 and attendant positive indication from sign bit comparator 555 enables data path "and" gate 558 to transmit comment C from register 556 to data path "or" gate 548. This comment qualifies the most representative curve value transmitted to the executive control circuitry as a good value but one obtained under conditions in which the maximum allowable dwell time was exceeded by the sample of interest.

A negative output from subtractor 562 with attendant negative indication from sign bit comparator 561 enable data path "and" gate 556 to transmit comment D from register 564 to data path "or" gate 548. This comment qualifies the most representative curve value transmitted to the executive control circuitry as a good value but one obtained under conditions in which the dwell time of the sample of interest is below the minimum dwell time.

In the event of either a negative indication from sign bit comparator 561 or a positive indication from sign bit comparator 555, "or" gate 572 is pulsed as indication to condition "and" gate 574. This same pulse is applied to inverter 576 to disable "and" gates 542 and 546 to thus render impossible the transmission of comments A or B from registers 540 and 544 to "or" gate 548 in the event of the transmission as described of either of comments C or D from registers 556 or 564 to said "or" gate. Thus is believed made clear that the window monitoring circuitry of FIG. 10 provides an automatically operable override function with regard to inconsistent qualifying comment transmission.

Pulsing of "or" gate 512 (FIG. 5C) in response to a negative result from any of adders 494, 502 and 508 as described in detail hereinabove, will operate as indicated to enable data path "and" gate 542 to transmit comment A, which qualifies the most representative curve value transmitted to the executive control circuitry as a good but not perfect value, from register 540 to data path "or" gate 548.

A positive output from adder 508 (FIG. 5C), which indicates that not even the inner envelope of the flat criteria tolerance R is exceeded by the difference between the suggested, peak and pre-window values, operates to enable data path "and" gate 546 to transmit comment B, which identifies the transmitted most representative curve value as a perfect value, from register 544 to data path "or" gate 548.

Returning to FIG. 4D, and considering also FIG. 5D, it may be seen as described hereinabove that the application of the delayed strobe from "or" gate 539 to subtractor 352, and the delayed enabling of data path "and" gates 356 and 550 from "and" gate 288 (FIG. 4C) and "or" gate 549, respectively, will be effective to concomitantly output the baseline corrected most representative curve value, and the appropriate comment, to the executive control circuitry 20.

The pulsing of "or" gate 549 also conditions "and" gate 574 (FIG. 5D) whereby, any pulsing of "or" gate 572 will be effective to enable the former gate to pulse "or" gate 282 (FIG. 4D) to deactivate the channel of interest by the setting of channel inactive latch 284 of said FIG., it being understood that "and" gate 572 will only be enabled under conditions in which the dwell time of the sample of interest has exceeded the maximum allowable tolerance or shift permissible for channel recovery.

The pulsing of "or" gate 549 and the enabling of "and" gate 563 will operate to enable "and" gate 570 to pulse "or" gate 580 and one shot 578 (FIG. 2C) in that order to reset the buffer 80 and, after an appropriate delay, to reload said buffer at the 110 input thereof and to pulse "or" gate 92 (FIG. 2C) to strobe said buffer and thereby commence the exclusive pulsing thereby of "and" gate 600, whereby the next provided data point will be applied to the next sample curve portion monitoring circuitry of the invention to determine if a succeeding sample is now properly present in the analysis apparatus.

Under these last-mentioned conditions, and referring now to FIG. 6 for the description of the next sample monitoring function, it may be understood that as the next data point, or data point 601 arrives at the peak monitoring circuitry of the invention, the exclusive enabling of "and" gate 600 from octal decoder 44 (FIG. 2C) and the common strobe 22 will be effective to strobe subtractor 604 to subtract the next sample clock time as stored in register 602 from the sample clock time as stored in the sample clock register 72. That same strobe is further delayed as indicated to then strobe subtractor 608 to subtract the nominal sample time (which may, for example, be 24 seconds if the analysis apparatus is operated at a rate of 150 samples per hour) as stored in register 606, from the result of the subtraction in subtractor 604, which result must, of necessity, be positive. After an appropriate further delay, the same strobe is applied as indicated to operate sign bit comparator 614 to determine the sign of the result of the subtraction in subtractor 608. If this result is negative, to indicate that aspiration of 5C next sample commenced within one nominal sample time of the current sample, "or" gate 580 and one shot 578 (FIG. 2C) are pulsed as indicated from sign bit comparator 614 to reset buffer 80, and the same then reloaded at the 010 input of said buffer. The delayed pulsing of "or" gate 92 (FIG. 2C) from sign bit comparator 614 will then be effective to strobe buffer 80 to commence the exclusive conditioning of "and" gate 42 to switch the peak monitoring circuitry of the invention to the monitoring of the rise portion of the curve 10 for the next sample upon the application of the next data point 608 to said circuitry.

If the indication from sign bit comparator 614 is positive, to indicate that a succeeding sample is not properly present in the analysis apparatus, the load input to stall counter 618 is pulsed as indicated to load a tolerance V, or the time that is required in number of data point passes that it will take this channel to wash out to baseline, from register 616 into said stall counter. Concomitantly, "or" gate 580 and one shot 578 are pulsed to reset buffer 80 and, after an appropriate delay, said buffer is reloaded at the 111 input thereof so that it will commence the exclusive conditioning of "and" gate 700 (FIG. 2C) upon the application of the strobe from sign bit comparator 614 to said buffer through "or" gate 92. As a result, the application of the next data point 608 to the hold and stall curve portion monitoring circuitry of the invention is effected.

Referring now to FIG. 7 it may be understood that the overall function of stall monitoring, is to hold the peak monitoring circuitry of the invention inactive for the period of time which it will take the channel of interest to work out to baseline, and to then switch such circuitry to the baseline monitoring function. Thus, it may be seen that the combination of the next strobe from common strobe 22 which occurs in response to the application of the next data point, or data point 703 of curve 10 of FIG. 1, to the sliding window 26 of FIG. 2A and the exclusive pulsing of "and" gate 700 from buffer 80 as described directly hereinabove, will result as indicated in the enabling of "and" gate 700, with attendant strobing of subtractor 702 and decrementing of stall counter 618. Subtractor 702 is operable to subtract the sample time as applied thereto from register 606 from the last computed dwell time as applied thereto from register 410.

This same strobe from "and" gate 700 is effective as indicated, after an appropriate delay, to strobe subtractor 706 to subtract the next sample clock time from register 602 from the result of the subtraction in subtractor 702. If the result of this latter subtraction is positive, as determined by the application as indicated of the sign bit to sign bit comparator 707 and the delayed strobing of the latter from "and" gate 700, and to indicate that the sample clock has not yet reached the time at which monitoring of the rise portion of the curve of the next sample should be commenced, sign bit comparator 707 is effective as indicated to strobe sign bit comparator 708 to determine the sign of the count in stall counter 618 which was previously decremented. If the count in the stall counter is zero or greater with an attendant positive stall count sign, to indicate that tolerance V (register 616 of FIG. 6) has not yet been exceeded and that the sample clock time for the next sample from sample clock 602 has not yet commenced, the application of this positive stall count sign to sign bit comparator 708 will be effective as indicated to instruct the stall monitoring circuitry to wait for the next data point. If, under the above conditions with regard to sign bit comparators 706 and 707, the count in the stall counter 618 is determined to be less than zero with an attendant negative stall count sign, to indicat that tolerance V has been exceeded before the arrival of the next sample, the application of this negative stall count sign to sign bit comparator 708 will result as indicated in the pulsing of "or" gates 92 and 580 (FIG. 2) to reset and later strobe register 80, and the reloading of the latter at the 000 input thereof. As a result, the exclusive enabling of "and" gate 800 (FIG. 2) will be effected from octal decoder 44 and common strobe 22, in response to the next data point 699 whereupon said data point will be applied to the baseline monitoring circuitry for processing as described in detail hereinbelow.

Returning here to the operation of sign bit comparator 707 of the stall monitoring circuitry, it may be seen that, if the result of the subtraction in subtractor 706 was negative, to indicate that the arrival of the next sample has occurred within the time required for the channel of interest to wash out to baseline in that time, "or" gates 92 and 580 are pulsed as indicated, and register 80 reloaded at the 010 input thereof with resultant exclusive enabling of "and" gate 42 and application of the next data point 699 to the rise monitoring circuitry for processing as described in detail hereinbelow.

Referring now to the baseline monitoring circuitry of FIGS. 8A, 8B and 8C, respectively, it may be seen that, in the event of a switch to baseline monitoring as described hereinabove, the exclusive enabling of "and" gate 800 in response to data point 699 will function to strobe subtractor 802 to subtract the dwell time minus sample time and an early rise time, as tolerance D' from the sample clock time. In the event that the sign of the result of this subtraction is positive, as determined by sign bit comparator 806, "or" gates 92 and 580 are pulsed as indicated, and register 80 reloaded at the 001 input thereof to apply the next data point to the first curve monitoring circuitry through the resultant enabling of "and" gate 900.

In addition, "or" gate 807 is pulsed to reset recently reactivated latch 810 and set channel active latch 812, to thereby indicate that the channel of interest is still active and that appropriate data gating procedures can be continued.

If the result of the subtraction in subtractor 802 is determined to be negative by comparator 806, to indicate that the curve 10 is still on baseline, and if the recently reactivated latch 810 has been reset, "and" gate 808 is enabled to increment the reactivation counter 816 and, after an appropriate delay, to strobe comparator 814 to compare the dwell time count from buffer 804 with the count from reactivation counter 816. If the result of this comparison is not equality, no further use of the data point 699 is made at this point by the baseline monitoring circuitry and the same simply waits for the next data point. If the dwell time count is determined to be equal to the reactivation count to indicate that one full dwell time has expired since the reactivation of latch 810, "or" gate 815 is pulsed to pulse "or" gate 818 to strobe the eight data point averaging circuit 820 to average the eight data points currently in sliding window 26 (FIG. 2A), it being understood that, in actual practice, each of these data points will always be from the baseline portion of the curve 10. In addition, "or" gate 821 is then pulsed as indicated to enable "and" gate 822 to apply the average to current baseline buffer 824 for storage in the latter. Too, reactivation counter 816 is strobed to reset the same and "or" gate 807 is pulsed to respectively reset latch 810 and set latch 812.

The additionally delayed pulse from "or" gate 815 is then effective to strobe subtractor 826 to subtract the most current data point from the current baseline average. The output of subtractor 826 is applied as indicated to negative difference circuit 828 to insure a negative sign therefore and then to adder 830 for addition to an inner envelope on baseline, or tolerance A', from buffer 832. The result of this addition is applied as indicated to sign bit comparator 834 and, if positive, "and" gate 836 is enabled by delayed pulsing as indicated from "or" gate 815 to pulse "or" gate 838 and reset shift counter 840, whereupon the baseline monitoring circuitry simply waits for the next data point, it being understood that a positive sum from adder 830 establishes that the difference between the most current data point and the current baseline average is within the inner baseline envelope and thus represents tolerable drift rather than a shift. Thus, the shift counter is reset to zero as described since the same is effective only to count consecutive shifts, i.e. variations between DPo and the current baselines which exceed said envelope.

If the indication from sign bit comparator 834 is negative, subtractor 842 is strobed as indicated to subtract the next most current data point from the most current data point. The result of this subtraction is applied to negative difference circuit 844 to insure a negative sign therefor, and therefrom to adder 846 for addition with tolerance A'. A negative result from adder 846, which indicates that the most current data point exceeds the inner envelope tolerance with regard to the next most current data point, and may thus be considered a noise or drift point, is operated upon by sign bit comparator 848 as indicated to increment noise counter 874, through "and" gate 872, and to reset shift counter 840 through "or" gate 838. If the result from adder 846 is determined by comparator 848 to be positive, "and" gate 850 is enabled to increment the shift counter 840 and to delay strobe subtractor 854 to subtract the allowable number of successive shift counts, or tolerance C', from the number of shift counts as stored in shift counter 840.

A negative result from subtractor 854, as determined by sign bit comparator 856, operates to cause the baseline monitoring circuitry to simply wait for the next data point since the maximum number of allowable successive shift counts has not yet been exceeded. A positive result from subtractor 854, which indicates that tolerance C' has been exceeded and that a shift has occurred, is operated upon by comparator 856 to condition "and" gates 858 and 870.

If the channel of interest is a dynamic channel or, that is to say, one in which samples are being run, "and" gate 858 is enabled to strobe subtractor 860 to subtract the tolerance D' from the sample clock. A positive result from subtractor 860, which indicates that the next or first sample is about to arrive at the channel of interest, is operated upon by sign bit comparator to enable "and" gate 866 to pulse "or" gate 838 with the resultant re-setting of shift counter 840 to zero to prevent the determination of a shift under these conditions. In addition, the baseline monitoring circuitry then waits for the next data point.

A negative result from subtractor 860, which indicates that the beginning of the first or next sample is not imminent and that baseline monitoring should continue, is operated on by comparator 864 to pulse "or" gates 868 and 818 to strobe averaging circuit 820 to average the eight most current data points and to provide a new baseline average for subtraction in subtractor 876 from the formerly current baseline average as applied to said subtractor from buffer 824. The result of this subtraction is applied as indicated to negative difference circuit 877 and added, in negative form, with the outer envelope on baseline, or tolerance B', from buffer 880 in adder 878.

A negative result from adder 878, which indicates that the new baseline average is outside of tolerance with regard to the formerly current baseline average, is operated upon by sign bit comparator 882 to enable "and" gate 896, with resultant pulsing of "or" gates 899 and 821, to enable data path "and" gate 822 and apply the new baseline average to current baseline buffer 824. In addition, "or" gate 811 is pulsed as indicated to reset the channel active latch and deactivate the channel of interest since the baseline has now shifted beyond the acceptable tolerance.

A positive result out of adder 878, which indicates that the "new" baseline is within tolerance with regard to the "old" baseline, is operated upon by comparator 882 to strobe subtractor 886 to subtract the new baseline average from the starting baseline average as was determined, for example, at the start of daily operation and is stored in buffer 884. The result of this subtraction is applied as indicated to negative difference circuit 888 and then added, in negative form, with tolerance B' in adder 890. A negative result from adder 890, which indicates that the new baseline average is beyond the outer envelope tolerance with regard to the start-up baseline average, is operated upon by sign bit comparator 892 to enable "and" gate 898 and pulse "or" gate 899 to enable "and" gate 822 to replace the current baseline averaging circuit 820, and to pulse "or" gate 811 to reset channel active latch 812 and deactive the channel.

A positive result from adder 890, which indicates that the new baseline average is within the outer envelope tolerance B' with regard to the start-up baseline average, is operated on by sign bit comparator 892 to enable "and" gate 822, through "and" gate 894, to again replace the current baseline average with the new baseline average in buffer 824 although, under these conditions, channel deactivation through resetting of latch 812 is not effected. In addition, "or" gate 838 is pulsed as indicated to reset shift counter 840 to zero whereupon the baseline monitoring circuitry simply waits for the next data point.

In the absence of channel deactivation, operation of the baseline monitoring circuitry continues as described for each successive data point as applied thereto through the exclusive enabling of "and" gate 800 (FIG. 2A) until such time as the reading in the sample clock 72 which is started at the point of sample aspiration, becomes greater than tolerance D' whereupon a positive result will be provided from subtractor 802 and operated upon by sign bit comparator 806 to pulse "or" gates 92 and 580 of FIG. 2C and reload register 80 at the 001 input thereof as indicated. As a result, the next pulse from common strobe 22 will be effective, in conjunction with register 80 and octal decoder 44, to exclusively enable "and" gate 900 with resultant application of the next data point 701 to the first curve monitoring circuitry of FIGS. 9A and 9B.

Prior to detailed description of the operation of this first curve monitoring circuitry, it is believed well to make clear that the same is operable only upon data points generated by the flow of primer fluids which, for example, in blood sample analysis applications, might be constituted by standard or pooled sera, and which are flowed through the analysis apparatus at regularly spaced intervals intermediate successive blood samples. Too it is to be made clear that operation of the baseline monitoring circuitry of FIGS. 8A, 8B and 8C never takes place unless curve 10 has washed out to baseline whereby may be understood that, if first curve monitoring does occur, the same must, of necessity, follow baseline monitoring. Thus, if the curve 10 does not wash out to baseline after stall monitoring, but rather, goes directly into rise to indicate the arrival of the next sample, stall monitoring will be followed immediately by rise monitoring through operation of sign bit comparator 707 (FIG. 7) as described in detail hereinabove with resultant deletion of the baseline and first curve monitoring functions for the sample of interest.

For instances wherein baseline and first curve monitoring do take place, it may be understood that the overall function of first curve monitoring is to determine if the actual sample dwell time is within the necessary tolerances. This is to say that the specific dwell time is measured to determine the sample-to-sample tolerances and to establish that the particular analytical chemistry of the channel of interest is at least within the tolerances established for that chemistry in the analysis apparatus being utilized.

The enabling of "and" gate 900 is effective as indicated (FIG. 9B) to increment number of passes in first curve monitoring counter 902 and, in conjunction with look-for-rise latch 905 which may be assumed to be set for the first pass through first curve monitoring, to enable "and" gate 907 to strobe subtractor 911 to subtract the maximum number of passes in which to detect a rise, or tolerance G' from buffer 909, from the count in counter 902. A positive result from subtractor 911, which would indicate that it took too long to detect the rise and which would not, of course, occur on the first pass through first curve monitoring, is operated upon the sign bit comparator 914 to enable "and" gate 916 and pulse "or" gate 811 (FIG. 8C) to reset channel active latch 812 and deactivate the channel.

Figure 8A:
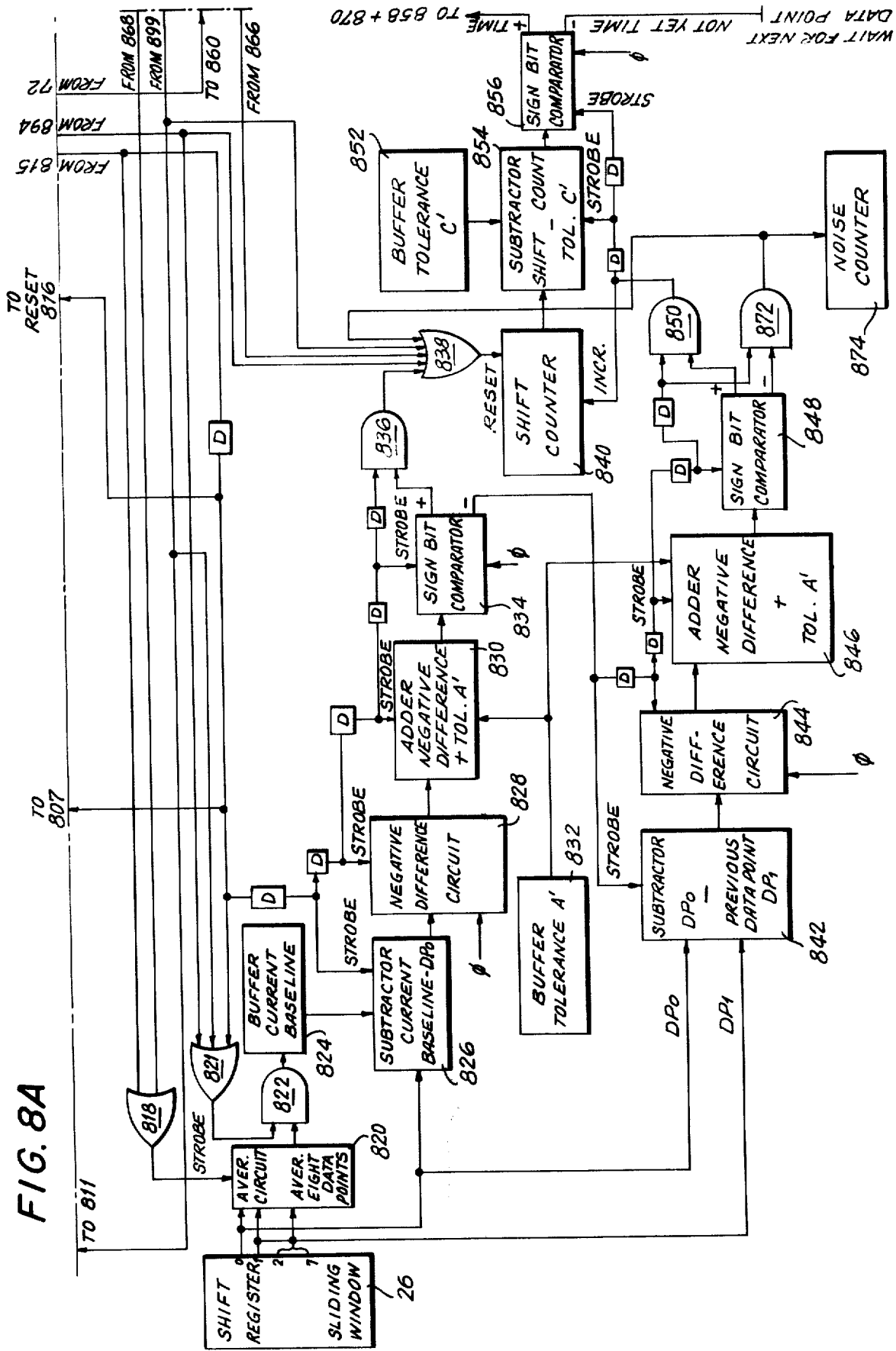
Figure 8B:
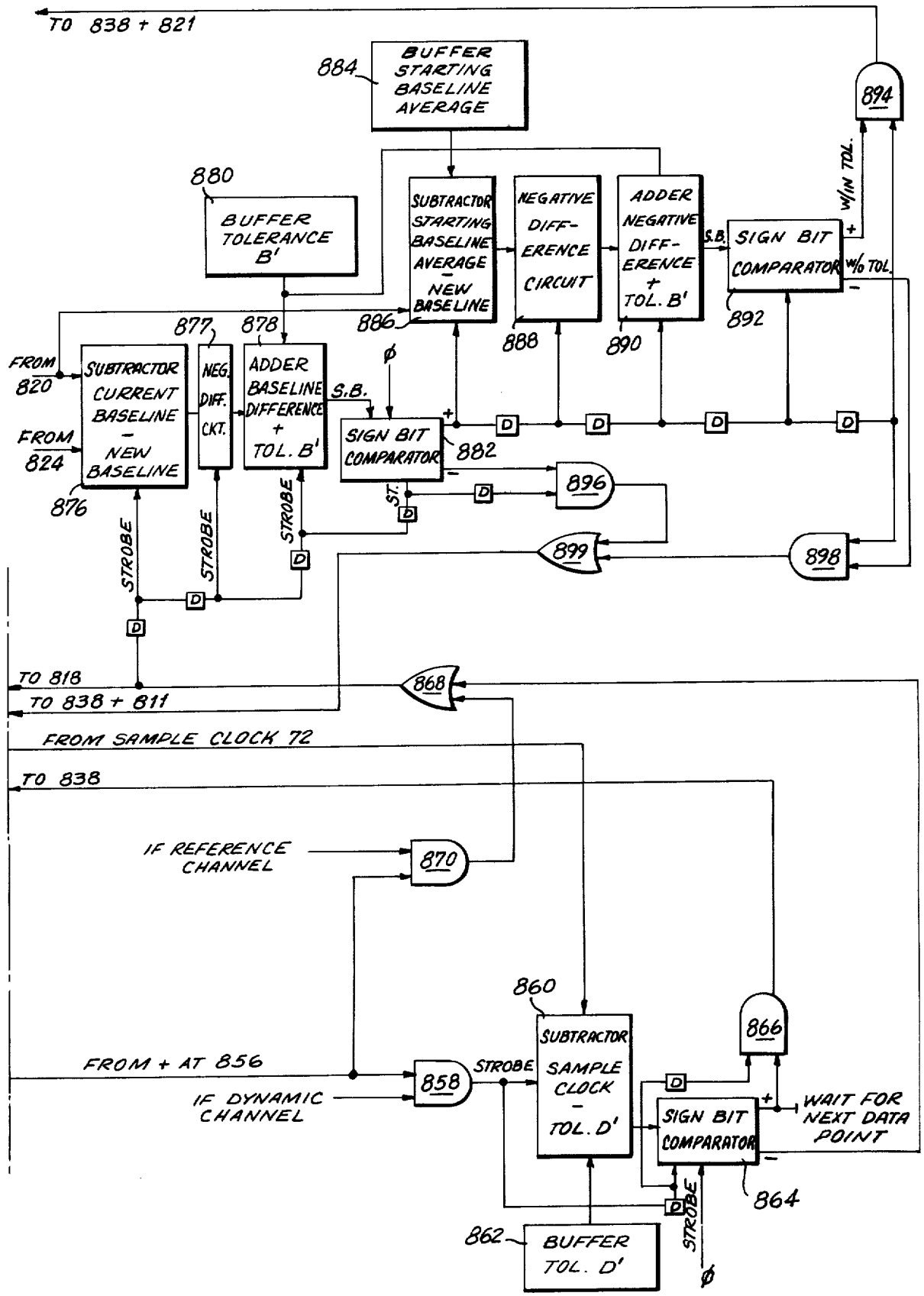

A negative result at subtractor 911, which indicates that tolerance G' has not been exceeded and as would always occur on the first pass through first curve monitoring, is operated upon by comparator 914 to strobe subtractor 918 to subtract the most current data point from window 26 (FIG. 2A) from the current baseline average as applied thereto from buffer 824 of FIG. 8A.

A positive result at subtractor 918, which indicates that the most current data point is equal to or less than the current baseline average and thus does not constitute a rise, is operated on by sign bit comparator 920 to pulse "or" gate 921 whereby the first curve monitoring circuitry waits as indicated for the next data point.

A negative result at subtractor 918, which might indicate a rise as should be obvious, is operated on by comparator 920 to, in conjunction with data path from subtractor 918, enable "and" gate 922 and strobe adder 924 to add the drop trigger tolerance F from buffer 217 (FIG. 4A) to the negative difference from subtractor 918. A positive result at adder 924, which indicates that the most current data point does not qualify as a rise, is operated on by sign bit comparator 926 to pulse "or" gate 921 with resultant wait for the next data point.

A negative result at adder 924, which indicates that the most current data point does qualify as a rise, is operated upon by comparator 926 to increment rise counter 928 and to then strobe subtractor 932 to subtract the number of successive rise counts for a rise, or tolerance H', from the number of rise counts then in counter 928. If the result of this subtraction is negative, to indicate that a rise has not yet occurred within the prescribed tolerances, the first curve monitoring circuitry is simply instructed to wait for the next data point through pulsing of "or" gate 921 by sign bit comparator 934. A positive result at subtractor 932, which indicates that a rise has occurred, is operated on by comparator 934 to set look-for-fall latch 936, and reset each of rise counter 928, look-for-rise latch 905 and number of passes in first curve counter 902, respectively, to zero as indicated.

On the first pass, only, through first curve monitoring, counter 902 is effective, in conjunction with the pulse from "and" gate 900 of FIG. 2C and the pulse from latch 905, to enable "and" gate 904 to strobe subtractor 906 and adder 910 as indicated. Subtractor 906 is effective as indicated to subtract the negative dwell time tolerance, or tolerance E', in buffer 908, from the dwell time in buffer 804 (FIG. 8C), while adder 910 is effective as indicated to add the positive dwell time tolerance, or tolerance F', in buffer 912 to the dwell time. Thereafter, the enabling of "and" gate 904 is additionally effective as indicated to load the output of subtractor 906 into the minimum dwell time register 560 (FIG. 5D) of the window monitoring circuitry, and to load the output of adder 910 in register 552 of said circuitry.

In the event that look-for-fall latch 936 has been set, this functions as indicated to condition "and" gate 938 whereupon the enabling of "and" gate 900 will be effective to enable the former to in turn enable "and" gate 940 for gating of the four least current data points from sliding window 26 (FIG. 2A) into four point averaging circuit 944, and for strobing of subtractor 941 to subtract the allowable number of passes in which a fall may be detected, or tolerance J' in buffer 943, from the number of passes in first curve count in counter 902.

A positive result at subtractor 941, which establishes that the allowable number of passes in which a fall may be detected has been exceeded to thus indicate a dwell time error, is operated on by sign bit comparator 945 to enable "and" gate 947 and pulse "or" gate 811 (FIG. 8C) to reset the channel active latch 812 and deactivate the channel.

A negative result at subtractor 941, which indicates that the allowable number of passes in which to find a fall has not yet been exceeded, is operated on by sign bit comparator 945 to strobe subtractor 946 for the subtraction of the most current data point from the average of the four least current data points in averaging circuit 944 in a continuing effect to detect a fall.

The output of subtractor 946 is applied as indicated to negative difference circuit 948 and therefrom, in negative form, to adder 949 for addition with the drop trigger tolerance F in buffer 217 (FIG. 4A). If the result of this addition is positive, to establish that the drop trigger tolerance F is higher than the negative difference to thus indicate that the most current data point is not a fall, but rather, is a noise point or the like which should be removed from the data point average, "and" gate 953 and "or" gate 955 are respectively enabled and pulsed as indicated by sign bit comparator 950 to replace the most current data point in sliding window 26, at the replacement input of the latter, with the average of the four least current data points from four point averaging circuit 944.

A negative result at adder 949, which indicates that the most current data point is a fall point, is operated on by sign bit comparator 950 to enable "and" gate 951 for incrementation of fall counter 952 and strobing of subtractor 956 to subtract the number of successive counts which constitute a fall, or tolerance I' in buffer 954, from the number of fall counts in the fall counter 952. A negative result at subtractor 956, which indicates that the number of fall counts is not sufficient to constitute a fall, is operated on by sign bit comparator 958 to enable "and" gate 960 with resultant pulsing of "or" gate 921 whereupon the first curve monitoring circuitry simply waits as indicated for the next data point.

A positive result at subtractor 956, which indicates that a fall has occurred, is operated on by comparator 958 to enable "and" gates 962 and 964 with resultant loading of the sample clock time from sample clock 72 into the dwell time buffer 804 to establish a new dwell time. This new dwell time is applied as indicated to subtractor 970, and the tolerance sum (O+T+X) is applied to said subtractor from buffer 972 for subtraction from said new dwell time upon delayed strobing of said subtractor as indicated from "and" gate 962. The result of this subtraction is then loaded into buffer 74 of FIG. 2C for use as described in detail hereinabove during the monitoring of the rise portion of the curve 10. In addition, look-for-fall latch 936 is reset as indicated to disable "and" gate 938, while look-for-rise latch 905 is set to insure that, the next time the peak monitoring circuitry of the invention is switched as described to the first curve monitoring function, the first curve monitoring circuitry will be in the look-for-rise condition wherein the enabling of "and" gate 900 will be effective to enable "and" gate 907 for operation as described of subtractor 911 and resetting of fall counter 952.

A positive result at subtractor 956 is also effective, through sign bit comparator 958, to pulse "or" gate 901 for resetting of number of passes in first curve counter 902 to zero, and to pulse "or" gate 553 (FIG. 5D) to strobe subtractors 554 and 562 to determine if the new dwell time as just loaded in dwell time buffer 804 from the sample clock 72 is within the maximum and minimum dwell time tolerances as are respectively stored in registers 552 and 560 of FIG. 5D. Operation of the relevant portion of the window monitoring circuitry of FIG. 5D then occurs as described in detail hereinabove with the delayed strobing of "or" gate 549 ultimately being effective to enable "and" gate 550 to load the comment from the appropriate one of the comment registers 540, 544, 556 and 564 into the executive control circuitry 20 of FIG. 2C. Concomitantly, "and" gate 570 is enabled as described in detail hereinabove to commence the exclusive pulsing of "and" gate 600 of FIG. 2C and switch the peak monitoring circuitry of the invention back to the next sample monitoring function to determine if another sample is forthcoming.

Operation of the peak monitoring method and apparatus of the invention are, of course, continuous as described until the analysis of all of the available blood samples has been completed by the analysis apparatus and the data outputs resulting therefrom applied as described to the peak monitor. Following this, the peak monitor will simply switch to the baseline monitoring function as the curve 10 washes out to baseline, and will remain in such condition until deactivated, or until further samples are provided to the analysis apparatus.

Although disclosed hereinabove as applied to the peak monitoring of the analytical results of a single channel of automated blood analysis apparatus in order to avoid unnecessary overcomplication of the disclosure, it may be understood that, in actual practice, such analysis apparatus would probably include a number of channels, each being operable to quantitatively analyze a portion of each blood sample for a different constituent of interest, and that the disclosed functions of the peak monitor would, of course, be applied to the analytical results provided from each of said analysis channels. Too, although disclosed hereinabove by way of example as applied to the peak monitoring of the analysis results from automated blood sample analysis apparatus, it is to be made clear that the method and apparatus are by no means limited to such application, but rather would also be applicable to the peak monitoring of a very wide variety of analytical results and/or the peak monitoring of a very wide variety of output data in no way related to analytical results.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method for determining the validity of the results of the quantitative analysis of a series of samples with regard to a particular sample constituent by automated sample analysis apparatus which operate in accordance with a sample analysis chemistry determined by said constituent, the steps of, determining the ideal operational characteristics of the sample analysis apparatus in accordance with said sample analysis chemistry, analyzing each of said samples in series in accordance with said sample analysis chemistry, providing a series of data outputs as the results of the analysis of each of said samples, storing the data outputs as the same as provided, averaging some at least of the previously provided and stored data outputs for the same sample, comparing the data outputs as the same are provided in turn with said average of previously provided data outputs for the same sample to determine the variations therebetween, and comparing said variations with said ideal operational characteristics of the analysis apparatus for the particular sample analysis chemistry involved to verify the validity of the thusly monitored data outputs.

2. In a method as in claim 1 further comprising, the steps of, selecting as the sample analysis results in accordance with said comparisons said those of said data outputs which are most analytically correct to thus maximize the accuracy of said results.

3. In a method as in claim 1 further comprising, the steps of, discontinuing the operation of said analysis apparatus in the event that a data output is determined to be invalid.

4. In a method as in claim 2 further comprising, the steps of, qualifying as imperfect those of said data outputs which are selected as the sample analysis results in the event that a data output is determined to be invalid.

5. In a method as in claim 1 wherein, the comparison of each of said data outputs and said average comprises the steps of, subtracting said average from said data output.

6. In a method as in claim 1 wherein, the averaging of said previously provided data outputs comprises, the steps of, including the most previously provided data output in said average.

7. In a method as in claim 1 wherein, said ideal operational characteristics of said analysis apparatus comprise a plurality of data output variation tolerances which are respectively applicable to the magnitudes of said data output variations, and a plurality of data output variation tolerances which are respectively applicable to the number of said data output variations, and the comparison of said data output variations to verify the validity of the data outputs comprises, the steps of, classifying and storing each of data outputs upon the provision thereof in accordance with which of said tolerances will be applicable thereto, comparing the magnitude and number of said data output variations to said tolerances to determine if the latter are exceeded thereby to in turn verify the validity of said data outputs.

8. In a method as in claim 7 wherein, the comparison of said data output variations to said tolerances comprises, the steps of, sequentially comparing a plurality of tolerances to each of said data output variations.

9. In a method as in claim 7 further comprising, the steps of, rejecting said data output and discontinuing the operation of said sample analysis apparatus in the event a data output variation or plurality thereof exceed an applicable tolerance.

10. In a method as in claim 7 further comprising, the steps of, qualifying as imperfect said those of said data outputs which are selected as the sample analysis results in the event that a data output variation or plurality thereof exceed an applicable tolerance.

11. In a method as in claim 2 wherein, said ideal operational characteristics of said analysis apparatus comprise a plurality of data output variation tolerances which are respectively applicable to the magnitudes of said data output variations, and a plurality of data output variation tolerances which are respectively applicable to the magnitudes of said data output variations, and a plurality of data output variation tolerances which are respectively applicable to the number of said data output variations, and the selection of said those of said data outputs which are most analytically correct comprises, the steps of, storing the data output variations as the same are determined, comparing the magnitude and number of said data output variations to said tolerances, storing the results of the last mentioned comparisons, and selecting said those of said data outputs as the most analytically correct in accordance with the results of the last-mentioned comparisons.

12. In a method as in claim 11 wherein, said data outputs will change in magnitude at the beginning of the analysis of each sample until generally steady state data output conditions are reached, and the comparison of said data output variations to said tolerances and the selection of those of said data outputs comprise, comparing the magnitude and number of said data output variations which occur at the beginning of sample analysis to tolerances to determine the nature of said change in data output magnitude, and selecting said those of said data outputs from the data outputs which are provided during said generally steady data output conditions in accordance with the determined nature of the change in data output magnitude during the beginning of sample analysis.

13. In a method as in claim 12 wherein, said data outputs will generally rise in magnitude during th beginning of sample analysis to assume generally steady state data output conditions and will generally fall in magnitude from the latter at the termination of sample analysis, and the selection of said those of said data outputs comprise, the steps of, verifying said rise in data output magnitude in accordance with the stored results of the comparisons between said data output variations and said tolerances, and selecting and outputting the data outputs of the highest magnitude from those data outputs provided during said generally steady state data output conditions.

14. In a method as in claim 13 wherein, in the absence of verification of said rise in magnitude of said data outputs the selection of said those of said data outputs comprise, the steps of, selecting the data outputs from those data outputs provided during said generally steady state data output conditions which most immediately precede said general fall in data output magnitude.

15. In a method as in claim 11 wheren, the selection of said those of said data outputs comprise, the steps of, averaging a plurality of data outputs, storing the resultant data output average, and selecting said average as the analysis results.

16. In a method as in claim 1 wherein, said sample analysis apparatus are operable to successively analyze each of a series of samples and said ideal operating characteristics of said analysis apparatus comprise a sample-to-sample dwell time variation tolerance, the method further comprising, the steps of, measuring the dwell time of each of said samples as the same is being analyzed and storing the thusly determined sample dwell time, comparing the dwell time of the sample under analysis to that of previously analyzed samples to determine the variation therebetween, and comparing said variation to said tolerance to determine if the former exceeds the latter to thus verify the validity of the data outputs for the sample under analysis.

17. In a method as in claim 16, further comprising, the steps of, discontinuing the operation of the analysis apparatus if said dwell time variation exceeds said tolerance.

18. In a method as in claim 16 further comprising, the steps of, adopting and storing the dwell time of the sample under analysis as the new dwell time in the event that the variation between said dwell time and the previously stored dwell time does not exceed said dwell time variation tolerance.

19. Apparatus for determining the validity of the results of the quantitative analysis of a series of samples with regard to a particular sample constituent as are provided by automated sample analysis apparatus which operate in accordance with ideal operational characteristics as determined by the analysis chemistry of said sample constituent, means for analyzing each of said samples in series in accordance with said analysis chemistry and for providing a series of data outputs as the results of the analysis of each of said samples, means for monitoring the thusly provided data outputs, means for comparing the thusly monitored data outputs as the same are monitored in turn with previously provided data outputs for the same sample to determine the variations therebetween, and means for comparing said variations with said ideal operational characteristics of the analysis apparatus for the particular sample analysis chemistry involved to verify the validity of the thusly monitored data outputs.

20. Apparatus as in claim 19 further comprising, means for selecting as the sample analysis results in accordance with said comparisons those of said data outputs which are most analytically correct to thus maximize the accuracy of said results.

21. Apparatus as in claim 19 further comprising, means for discontinuing the operation of said analysis apparatus in the event that a data output is determined to be invalid.

22. Apparatus as in claim 20 further comprising, means for qualifying as imperfect those of said data outputs which are selected as the sample analysis results in the event that a data output is determined to be invalid.

23. Apparatus as in claim 19 wherein, the means for the comparison of said data outputs comprise, means for storing each of said data outputs upon the provision thereof by said sample analysis apparatus, and means for comparing each of said data outputs as it is provided with previously provided and stored data outputs to determine the variation therebetween.

24. Apparatus as in claim 23 wherein, the means for the comparison of each of said data outputs as it is provided with previously provided and stored data outputs comprise, means for averaging a number of said previously provided data outputs, and means for comparing each of said data outputs as it is provided with said average to determine the variation therebetween.

25. Apparatus as in claim 19 wherein, the means for the comparison of each of said data outputs and said average comprise, means for subtracting said average from said data output.

26. Apparatus as in claim 24 wherein, the means for said previously provided data outputs comprise, means for including the most previously provided data output in said average.

27. Apparatus as in claim 20 wherein, said ideal operational characteristics of said analysis apparatus comprise a plurality of data output variation tolerances which are respectively applicable to the magnitudes of said data output variations, and a plurality of data output variation tolerances which are respectively applicable to the number of said data output variations, and the means for the comparison of said data output variations to verify the validity of the data outputs comprise, means for classifying and storing each of data outputs upon the provision thereof in accordance with which of said tolerances will be applicable thereto, and means for comparing the magnitude and number of said data output variations to said tolerances to determine if the latter are exceeded thereby to in turn verify the validity of said data outputs.

28. Apparatus as in claim 27 wherein, the means for the comparison of said data output variations to said tolerances comprise, means for sequentially comparing a plurality of tolerances to each of said data output variations.

29. Apparatus as in claim 27 further comprising, means for rejecting said data output and discontinuing the operation of said sample analysis apparatus in the event a data output variation or plurality thereof exceed an applicable tolerance.

30. Apparatus as in claim 27 further comprising, means for qualifying as imperfect said those of said data outputs which are selected as the sample analysis results in the event that a data output variation or plurality thereof exceed an applicable tolerance.

31. Apparatus as in claim 29 wherein, said ideal operational characteristics of said analysis apparatus comprise a plurality of data output variation tolerances which are respectively applicable to the magnitudes of said data output variations, and a plurality of data output variation tolerances which are respectively applicable to the number of said data output variations, and the means for the selection of said those of said data outputs which are most analytically correct comprise, means for storing the data output variations as the same are determined, means for comparing the magnitude and number of said data output variations to said tolerances, means for storing the results of the last mentioned comparisons, and means for selecting said those of said data outputs as the most analytically correct in accordance with the results of the last-mentioned comparisons.

32. Apparatus as in claim 31 wherein, said data outputs will change in magnitude at the beginning of the analysis of each sample until generally steady state data output conditions are reached, and the means for the comparison of said data output variations to said tolerances and the selection of said those of said data outputs comprise, means for comparing the magnitude and number of said data output variations which occur at the beginning of sample analysis to tolerances to determine the nature of said change in data output magnitude, and means for selecting said those of said data outputs from the data outputs which are provided during said generally steady state data output conditions in accordance with the determined nature of the change in data output magnitude during the beginning of sample analysis.

33. Apparatus as in claim 32 wherein, said data outputs will generally rise in magnitude during the beginning of sample analysis to assume generally steady state data output conditions and will generally fall in magnitude from the latter at the termination of sample analysis, and the means for the selection of said those of said data outputs comprise, means for verifying said rise in data output magnitude in accordance with the stored results of the comparisons between said data output variations and said tolerances, and means for selecting and outputting the data outputs of the highest magnitude from those data outputs provided during said generally steady state data output conditions.

34. Apparatus as in claim 32 wherein, in the absence of verification of said rise in magnitude of said data outputs, the means for the selection of said those of said data outputs comprise, means for selecting the data outputs from those data outputs provided during said generally steady state data output conditions which most immediately precede said general fall in data output magnitude.

35. Apparatus as in claim 31 wherein, the means for the selection of said those of said those of said data outputs comprise, means for averaging a plurality of data outputs, means for storing the resultant data output average, and means for selecting said average as the analysis results.

36. Apparatus as in claim 19 wherein, said sample analysis apparatus are operable to successively analyze each of a series of samples and said ideal operating characteristics of said analysis apparatus comprise a sample-to-sample dwell time variation tolerance, the apparatus further comprising, means for measuring the dwell time of each of said samples as the same is being analyzed, and means for storing the thusly determined sample dwell time, means for comparing the dwell time of the sample under analysis to that of previously analyzed samples to determine the variation therebetween and means for comparing said variation to said tolerance to determine if the former exceeds the latter to thus verify the validity of the data outputs for the sample under analysis.

37. Apparatus as in claim 36 further comprising, means for discontinuing the operation of the analysis apparatus if said dwell time variation exceeds said tolerance.

38. Apparatus as in claim 36 further comprising, means for adopting and storing the dwell time of the sample under analysis as the new dwell time in the event that the variation between said dwell time and the previously stored dwell time does not exceed said dwell time variation tolerance.

* * * * *